(12) United States Patent
Pryor

(10) Patent No.: US 7,506,479 B2
(45) Date of Patent: Mar. 24, 2009

(54) SHEAR TRANSFER PLATE

(75) Inventor: Steven E. Pryor, Dublin, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 828 days.

(21) Appl. No.: 10/920,469

(22) Filed: Aug. 17, 2004

(65) Prior Publication Data

US 2006/0037256 A1 Feb. 23, 2006

(51) Int. Cl.
*E02D 27/00* (2006.01)
*E04B 1/38* (2006.01)

(52) U.S. Cl. .................. 52/293.3; 52/295; 52/712; 52/713; 52/714; 52/715

(58) Field of Classification Search .............. 52/293.3, 52/295, 712–715, 296
See application file for complete search history.

(56) References Cited

U.S. PATENT DOCUMENTS

| | | | |
|---|---|---|---|
| 896,330 A | 8/1908 | Scheelky |
| 1,382,082 A | 6/1921 | Heltzel |
| 1,924,724 A | 8/1933 | Olney |
| 2,163,808 A | 6/1939 | Pithoud |
| 2,289,604 A | 7/1942 | Van Cott et al. |
| 2,378,850 A | 6/1945 | Hyre |
| 2,691,293 A | 10/1954 | Patterson |
| 2,772,560 A | 12/1956 | Neptune |
| 2,911,702 A | 10/1959 | Clyncke |
| 3,126,928 A | 3/1964 | McMillan |
| 3,150,429 A | 9/1964 | Shaffer |
| 3,163,909 A | 1/1965 | Williams |
| 3,377,763 A | 4/1968 | Beckman |
| 3,458,184 A | 7/1969 | Schlosser |
| 3,469,815 A | 9/1969 | Brenneman |
| 3,490,760 A | 1/1970 | Nill |
| 3,552,734 A | 1/1971 | Severino et al. |
| 3,861,104 A | 1/1975 | Bower |
| 3,912,218 A | 10/1975 | Lister |
| 3,960,356 A | 6/1976 | Adams |
| 3,963,210 A | 6/1976 | Macklin |
| 3,964,219 A | 6/1976 | Hala |
| 3,972,168 A | 8/1976 | Allen |
| 4,000,591 A | 1/1977 | Courtois |
| 4,202,149 A | 5/1980 | Betrue, Sr. |
| 4,261,544 A | 4/1981 | Addison |
| 4,340,200 A | 7/1982 | Stegmeier |
| 4,412,407 A | 11/1983 | Melfi et al. |
| 4,524,553 A | 6/1985 | Hacker |
| 4,612,740 A | 9/1986 | Yamamoto |

(Continued)

OTHER PUBLICATIONS

"TJ-Shear Panel #2050 Specifier's Guide." Jun. 2004. Trus Joist. Boise, ID.

(Continued)

*Primary Examiner*—Richard E Chilcot, Jr.
*Assistant Examiner*—Mark R Wendell
(74) *Attorney, Agent, or Firm*—Charles Cypher; James Cypher

(57) ABSTRACT

A wall either wholly or partially made from a shear-resisting assembly that has a shear transfer device, or plate, disposed between the bottom strut and the underlying foundation. The shear transfer device joins the two anchor bolts, eliminating intermediate foundation bolts by transferring lateral shear loads to the anchor bolts in combination with the bottom strut.

31 Claims, 23 Drawing Sheets

U.S. PATENT DOCUMENTS

| | | | |
|---|---|---|---|
| 4,614,070 A | 9/1986 | Idland | |
| 4,640,063 A | 2/1987 | Ayala | |
| 4,641,478 A | 2/1987 | Nelson, Jr. | |
| 4,671,483 A | 6/1987 | Harbeke | |
| 4,736,554 A | 4/1988 | Tyler | |
| 4,790,509 A | 12/1988 | Cardwell et al. | |
| 4,932,818 A | 6/1990 | Garwood | |
| 5,002,446 A | 3/1991 | Anderson | |
| 5,050,364 A | 9/1991 | Johnson et al. | |
| 5,060,436 A | 10/1991 | Delgado, Jr. | |
| 5,240,224 A | 8/1993 | Adams | |
| 5,317,850 A | 6/1994 | Colonias et al. | |
| 5,337,534 A | 8/1994 | Nasca | |
| 5,357,721 A | 10/1994 | Alvarez | |
| 5,388,804 A | 2/1995 | Cohen et al. | |
| 5,407,182 A | 4/1995 | Hartley | |
| 5,467,570 A * | 11/1995 | Leek | 52/712 |
| 5,513,476 A | 5/1996 | Jones | |
| 5,611,179 A | 3/1997 | Leek | |
| 5,619,834 A | 4/1997 | Chen | |
| 5,670,076 A | 9/1997 | Leek | |
| 5,699,639 A * | 12/1997 | Fernandez | 52/707 |
| 5,706,626 A | 1/1998 | Mueller | |
| 5,729,950 A | 3/1998 | Hardy | |
| 5,836,132 A | 11/1998 | Weathersby | |
| 6,006,487 A * | 12/1999 | Leek | 52/698 |
| 6,018,917 A | 2/2000 | Leek | |
| 6,067,769 A | 5/2000 | Hardy | |
| 6,073,413 A | 6/2000 | Tongiatama | |
| 6,148,583 A | 11/2000 | Hardy | |
| 6,158,184 A | 12/2000 | Timmerman, Sr. et al. | |
| 6,158,188 A * | 12/2000 | Shahnazarian | 52/702 |
| 6,185,898 B1 | 2/2001 | Pratt | |
| 6,212,849 B1 | 4/2001 | Pellock | |
| 6,240,695 B1 | 6/2001 | Karalic et al. | |
| 6,244,004 B1 | 6/2001 | Timmerman, Sr. et al. | |
| 6,250,041 B1 * | 6/2001 | Seccombe | 52/712 |
| 6,298,612 B1 | 10/2001 | Adams | |
| 6,308,469 B1 * | 10/2001 | Leung | 52/167.3 |
| 6,389,767 B1 * | 5/2002 | Lucey et al. | 52/295 |
| 6,453,634 B1 * | 9/2002 | Pryor | 52/713 |
| 6,460,308 B1 * | 10/2002 | Armstrong et al. | 52/698 |
| 6,625,945 B2 * | 9/2003 | Commins | 52/293.3 |
| 6,643,986 B2 * | 11/2003 | Commins et al. | 52/483.1 |
| 6,668,508 B2 * | 12/2003 | Boone et al. | 52/645 |
| 6,796,099 B1 | 9/2004 | Georges et al. | |
| 2002/0002806 A1 | 1/2002 | Commins et al. | |
| 2002/0108332 A1 | 8/2002 | Timmerman, Sr. et al | |
| 2003/0009964 A1 | 1/2003 | Trarup et al. | |

OTHER PUBLICATIONS

"TJ-Shear Panel Specifier's Guide." Feb. 2003.Trus Joist. Boise, ID.
"TJ-Shear Panel Specifier's Guide." Mar. 2002.Trus Joist. Boise, ID.
Hardy Frame *Installation Manual with 1997 UBC Code Update. Details. Dimensions and How to Do It*! Simplified Structural Systems. Ventura, CA. May 2000.
"Accessories" Hardy Frames, Inc. Products Catalog. pp. 1-5, 36-37. Hardy Frames, Inc. Ventura, CA. Jan. 2004.
Ideen, Vorschläge. "Nagelplatten." *Bauen Mit Holz*. Germany. Mar. 2003. pp. 33-34.
Untitled document. General product information regarding Shear Max Panel retrieved from the internet on Dec. 16, 2004. URL: http://www.shearmax.com/about.htm. Shear Transfer Systems. Hesperia, CA. Copyright 1999.
"Easy Installation." Shear Max Panel installation instructions retrieved from the internet on Dec. 16, 2004. URL: http://www.shearmax.com/e_i.htm. Shear Transfer Systems. Hesperia, CA. All materials copyright 1999.
"Evaluation Report. PFC-5402. STS Prefabricated Lateral-Force Resisting (LFR) Panel System." ICBO Evaluation Service, Inc. Whittier, CA. Jul. 1, 1998. Retrieved from the internet on Dec. 16, 2004. URL: http://www.shearmax.com/t_data.htm.
Chou, Yeuan. "Research Report: RR 25369. General Approval—Shear Transfer Systems STS Prefabricated Lateral Force Resisting (LFR) Panel System." City of Los Angeles. At least as early as Mar. 1, 2000. Retrieved from the internet on Dec. 16, 2004. URL: http://www.shearmax.com/t_data.htm.
"Acceptance Criteria for Prefabricated Wood Shear Panels. AC130." ICBO Evaluation Service, Inc. Whittier, CA. 1997. Retrieved from the internet on Dec. 16, 2004. URL: http://www.shearmax.com/t_data.htm.
Bahlo, P. Letter to Timothy L. Timmerman, II dated Apr. 8, 1999. ICBO Evaluation Service, Inc. Whittier, CA. Retrieved from the internet on Dec. 16, 2004. URL: http://www.shearmax.com/t_data.htm.
Untitled technical data sheets regarding "Optional Top Connection for Double 2x4 Top Plates" and "Top Plate Connector." Retrieved from the internet on Dec. 16, 2004. URL: http://www.shearmax.com/t_data.htm, document located at http://www.shearmax.com/images/ENG-4002.pdf. Shear Transfer Systems. Hesperia, CA. Copyright 1999.
Bahlo, P. Letter to Timothy L. Timmerman, II dated Aug. 25, 1999. ICBO Evaluation Service, Inc. Whittier, CA. Retrieved from the internet on Dec. 16, 2004. URL: http://www.shearmax.com/t_data.htm.
Untitled drawing sheet regarding Shear Max Panel details retrieved from the internet on Dec. 16, 2004. URL: http://www.shearmax.com/t_data.htm, document located at http://www.shearmax.com/images/STS_DETAILS.pdf. Shear Transfer Systems. Hesperia, CA. Copyright 1999.
Untitled technical data sheet regarding "Allowable In-Plane Shear Loads" and "Formulation of Custom Heights" retrieved from the internet on Dec. 16, 2004. URL: http://www.shearmax.com/t_data.htm, document located at http://www.shearmax.com/images/allowable_shear_loads.pdf. Shear Transfer Systems. Hesperia, CA. Copyright 1999.
Bahlo, P. Letter to Timothy L. Timmerman, II dated Oct. 19, 1998. ICBO Evaluation Service, Inc. Whittier, CA. Retrieved from the internet on Dec. 16, 2004. URL: http://www.shearmax.com/t_data.htm.
"Shearmax™ used under UBC CHAP. 23 DIV. IV Conventional Light-Frame Construction as sec. 2320.11.4 Alternate braced wall panels." Retrieved from the internet on Dec. 16, 2004. URL: http://www.shearmax.com/t_data.htm, document located at http://www.shearmax.com/images/ENG-5001.pdf. Shear Transfer Systems. Hesperia, CA. Copyright 1999.
"Shearmax™ Panel. Installation as Easy as 1 . . . 2 . . . 3." Retrieved from the internet on Dec. 16, 2004. URL: http://www.shearmax.com/t_data.htm. Shear Transfer Systems. Hesperia, CA. Copyright 1999.
Shearmax™ Panel order sheets. Retrieved from the internet on Dec. 16, 2004. URL: http://www.shearmax.com/t_data.htm. Shear Transfer Systems. Hesperia, CA. Copyright 1999.
"AFS Holdown Form Shoes." *Advanced Connector Systems. Connectors for Wood Construction*. Product catalog. p. 34. Advanced Connector Systems. Tempe, AZ. 1997.
"Strong-Wall Shearwall." *Wood Construction Connectors*. Catalog C-2003; p. 31. Simpson Strong-Tie Company, Inc., Dublin, CA 2002.
"Welcome to Z-walls—Photos" Photos 1, 2. Retrieved from the Internet on Nov. 19, 2003. URL: http://www.z-wall.net/photos.html. Zwall. Honolulu, HI. Publication date unknown.
"Template Installation." *Strong-Wall® Shearwall Installation Guide*. p. 2. Simpson Strong-Tie Company, Inc. Dublin, CA May 2002.
"Strong-Wall concrete Templates." Product Information retrieved from the Internet on Jun. 11, 2004. URL: http://www.strongtie.com/strongwall/product_template.html?source=topnav. Simpson Strong-Tie Company, Inc. Dublin, CA.
"Templates: Installation Photos" *Strong-Wall Shearwall Installation Photos*. Retrieved from the Internet on Jun. 11, 2004. URL: http://www.strongtie.com/strongwall/photos/templates.htm. Simpson Strong-Tie Company, Inc. Dublin, CA.

"Strong-Wall™ Shearwall." Technical data sheets. Simpson Strong-Tie Company, Inc. Pleasanton, CA. Jun. 1999.

"ABS Anchor Bolt Stabilizer," "Strapmate Strap Holder," "Anchormate Anchor bolt holders." *Wood Construction Connectors.* Catalog C-2004. Simpson Strong-Tie Company, Inc. Dublin, CA 2003.

* cited by examiner

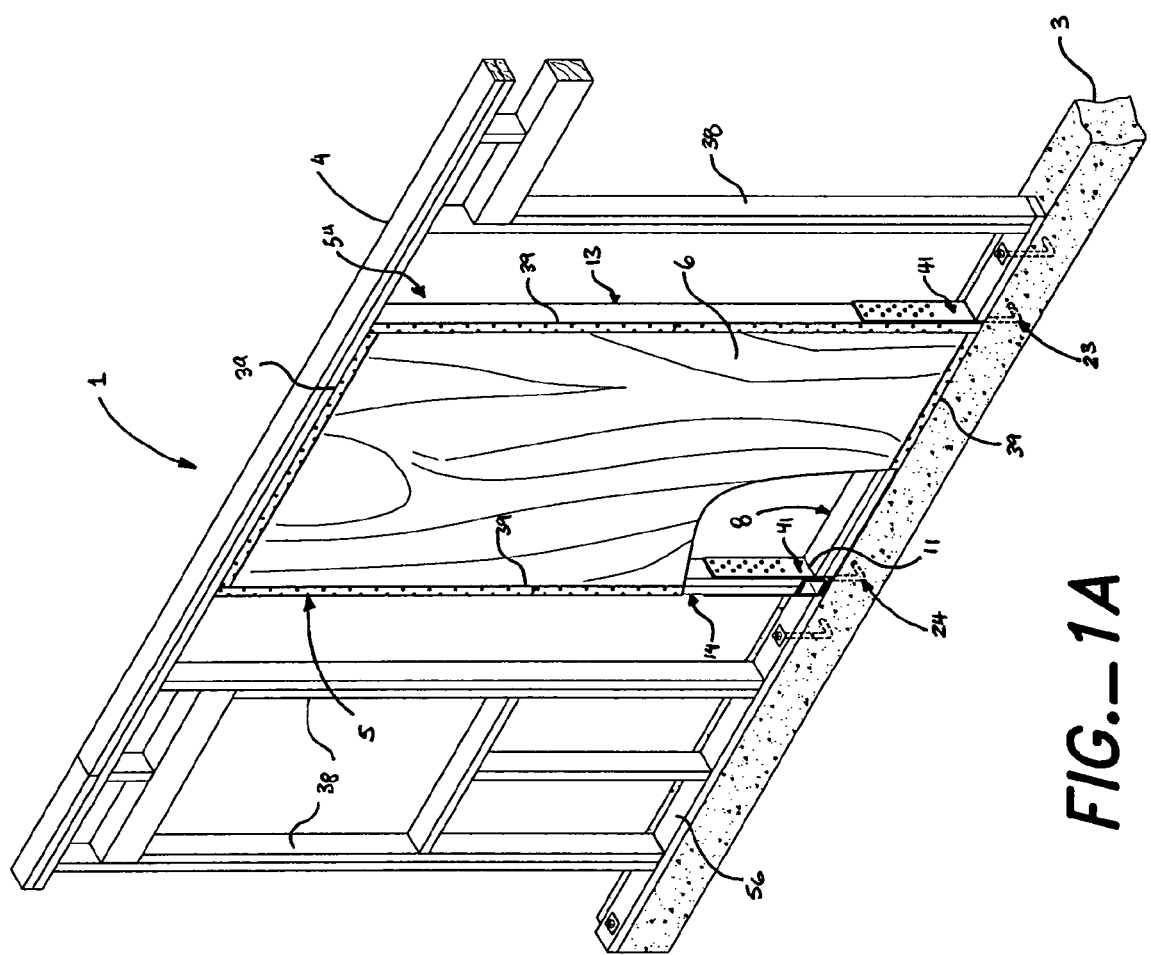
FIG._1A

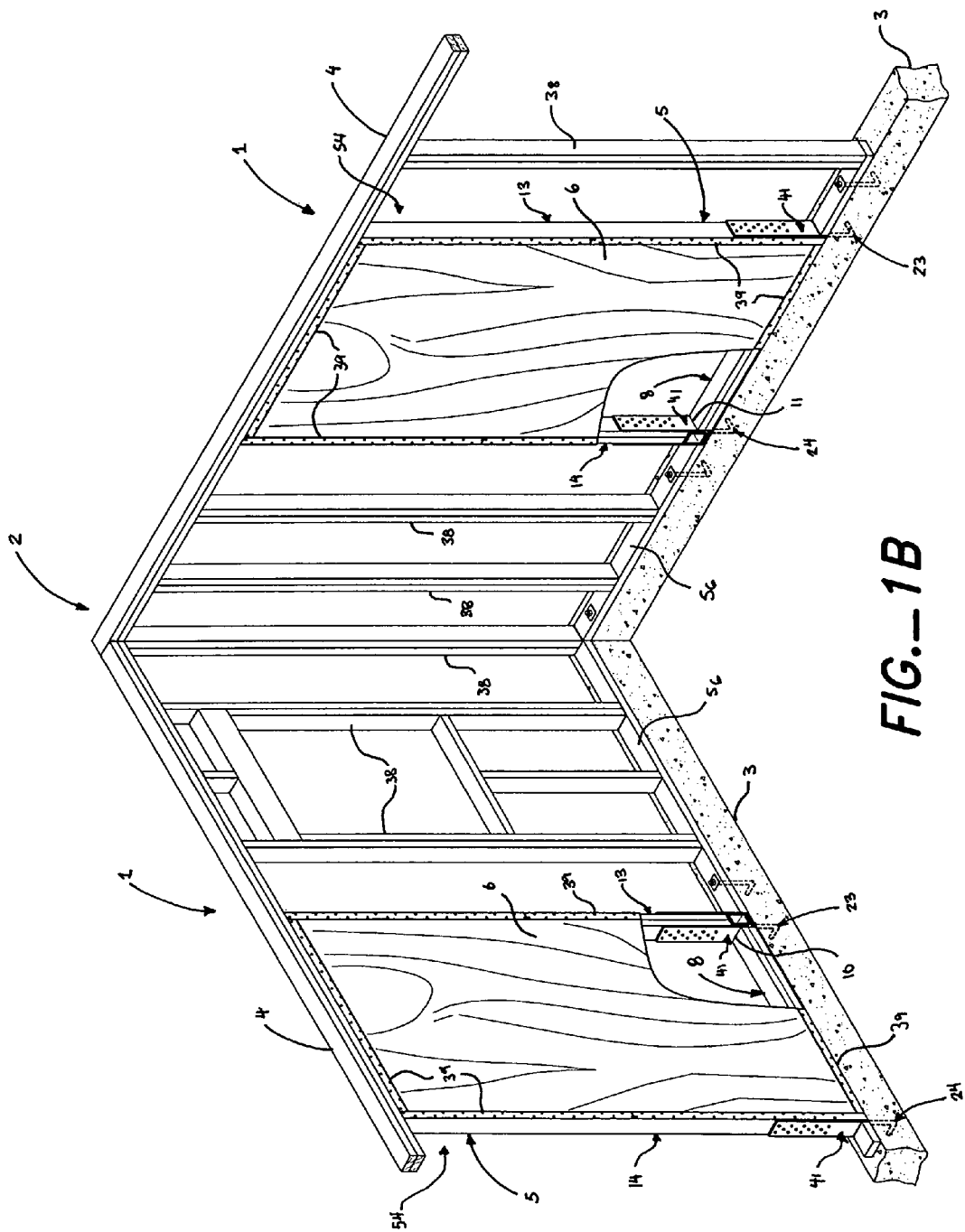
FIG._1B

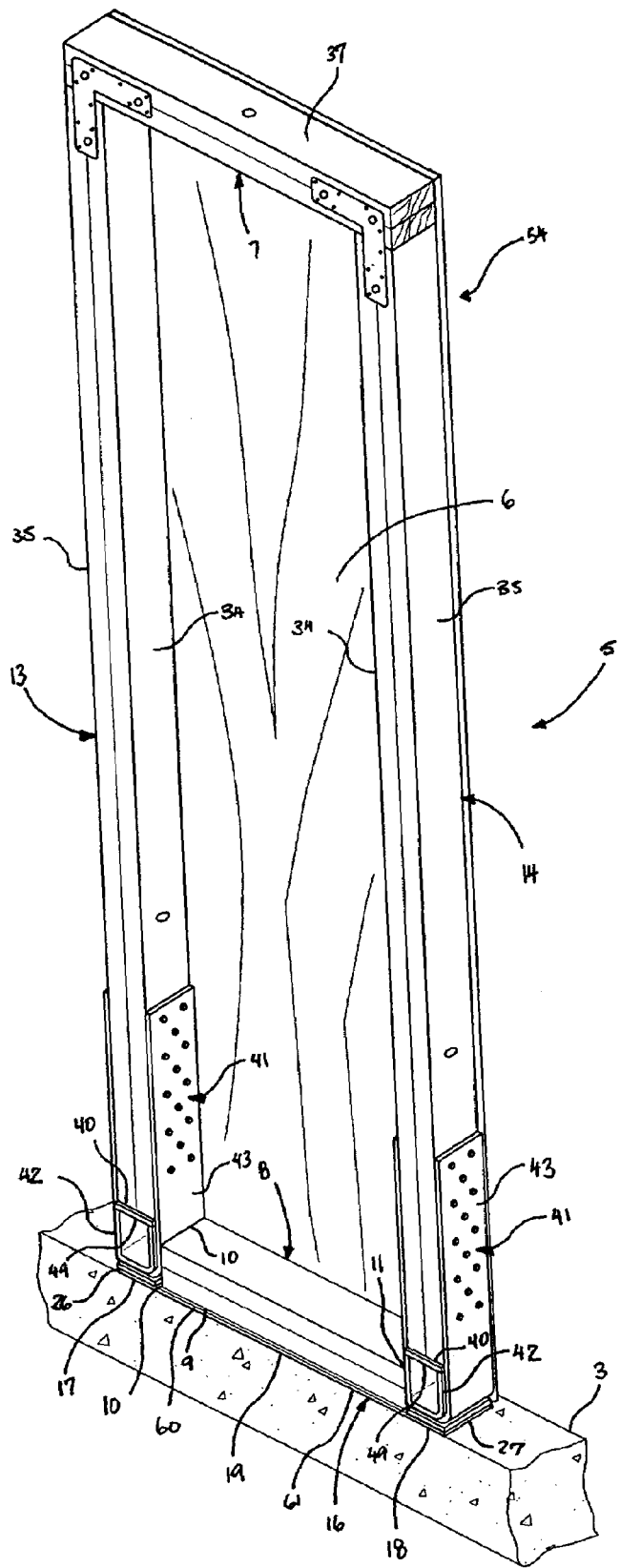
FIG._2A

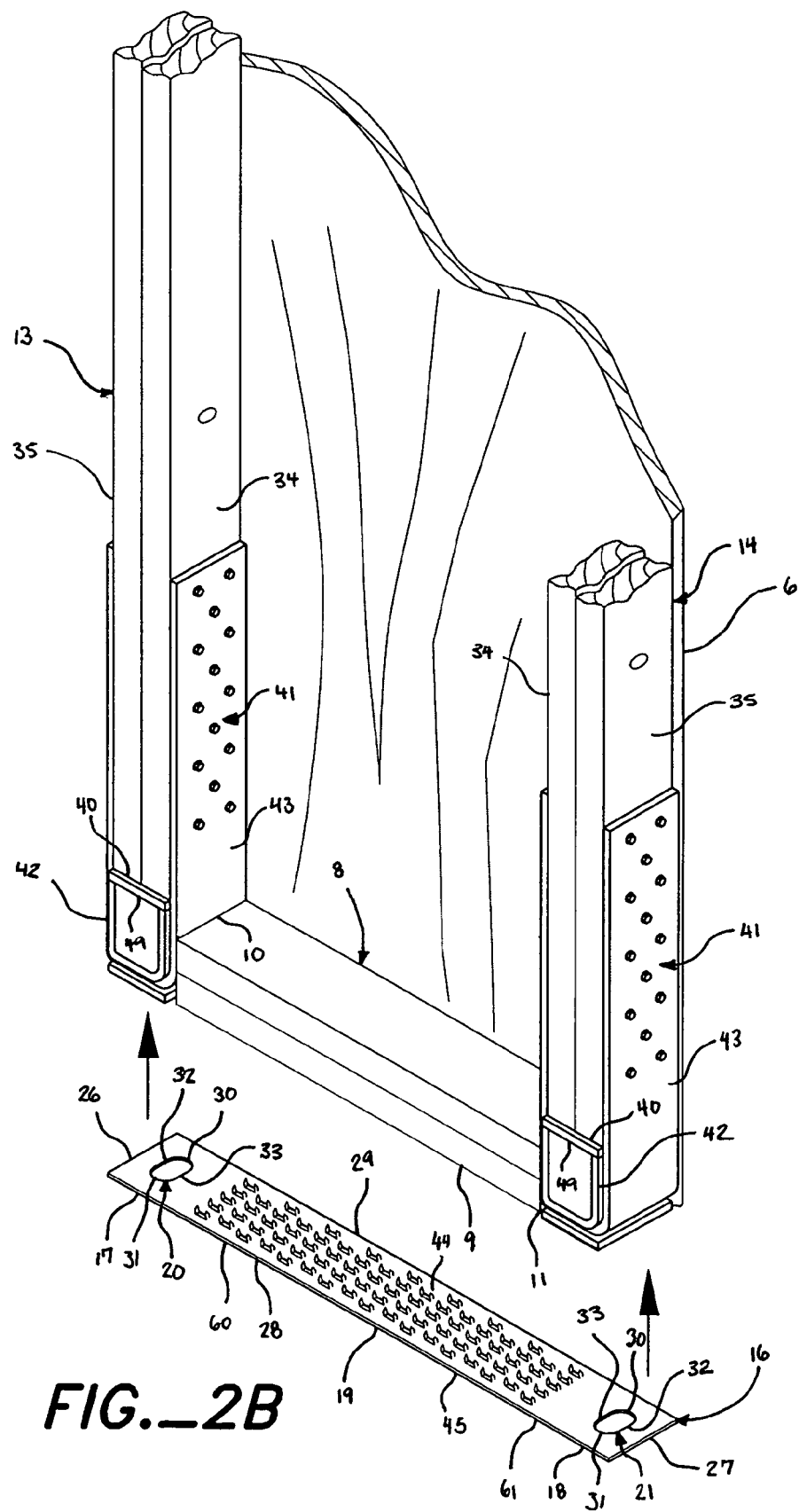
FIG._2B

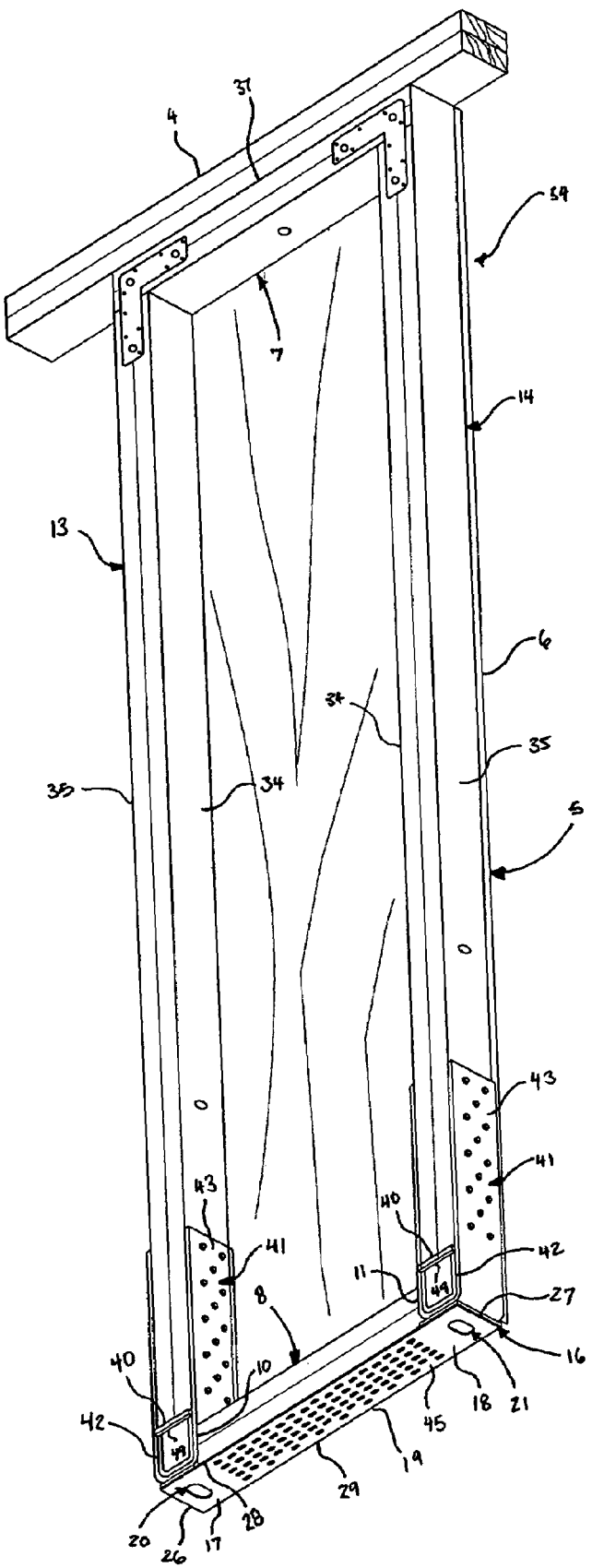
FIG._2C

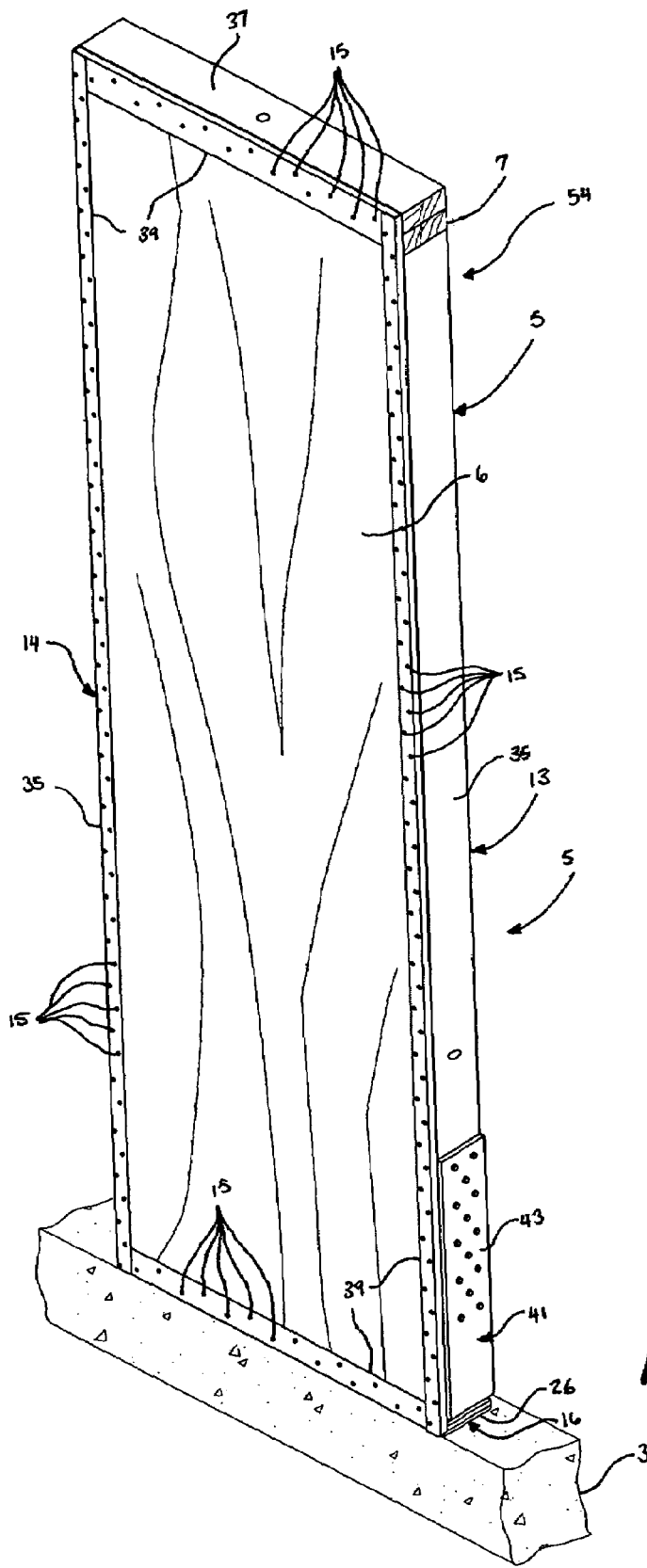
FIG._2D

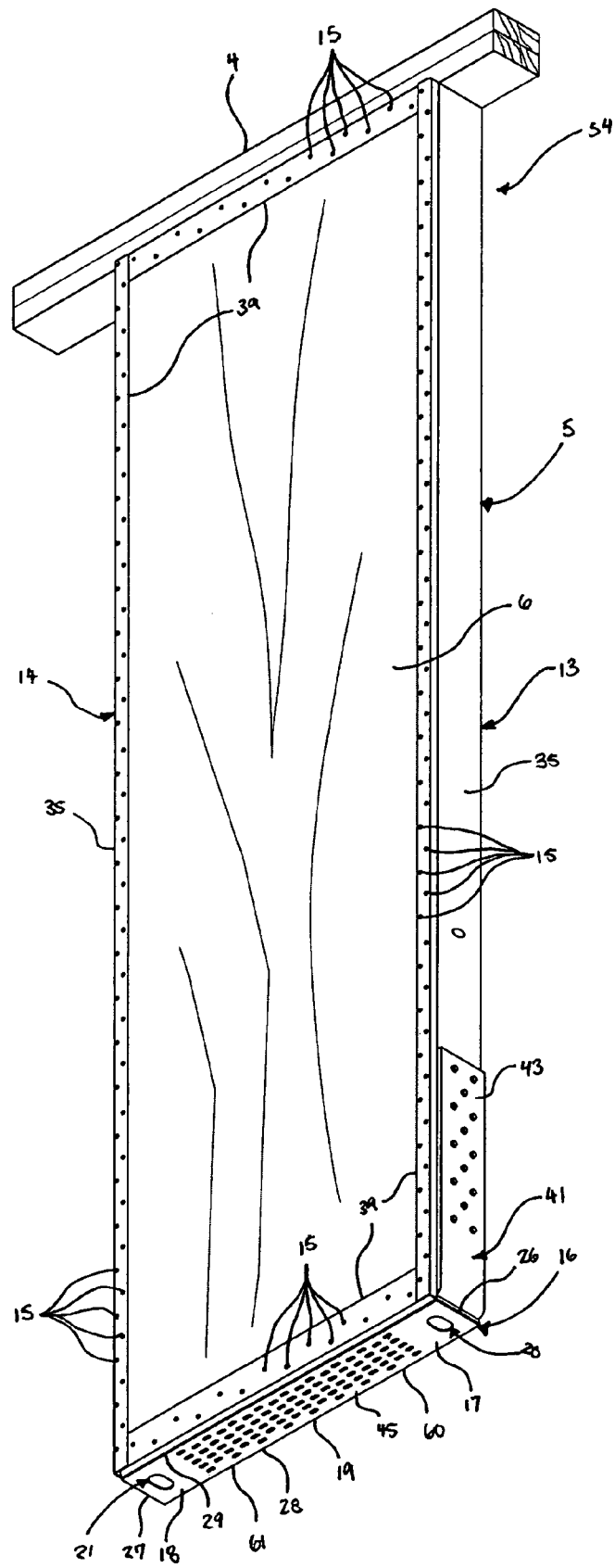
FIG._2E

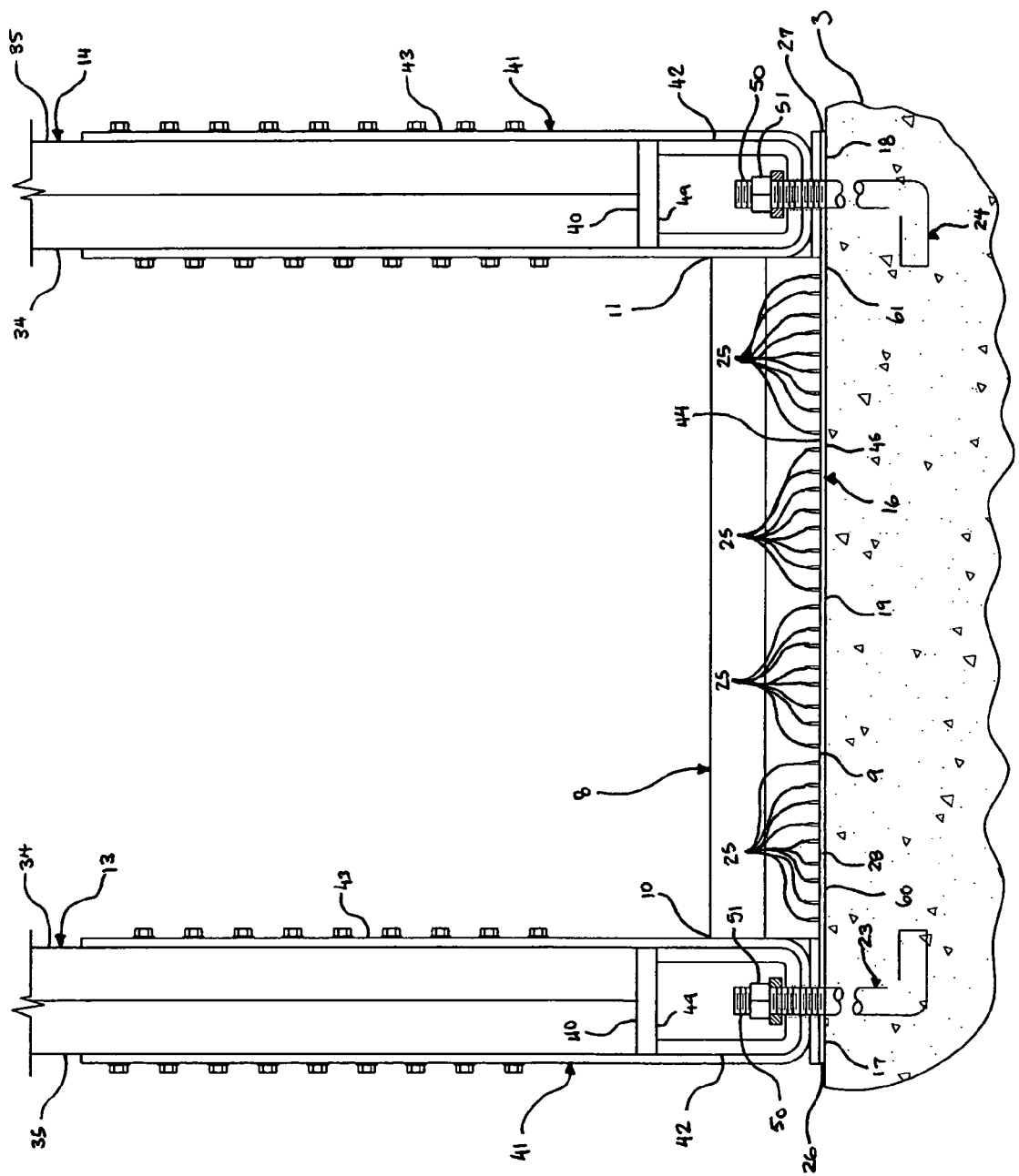

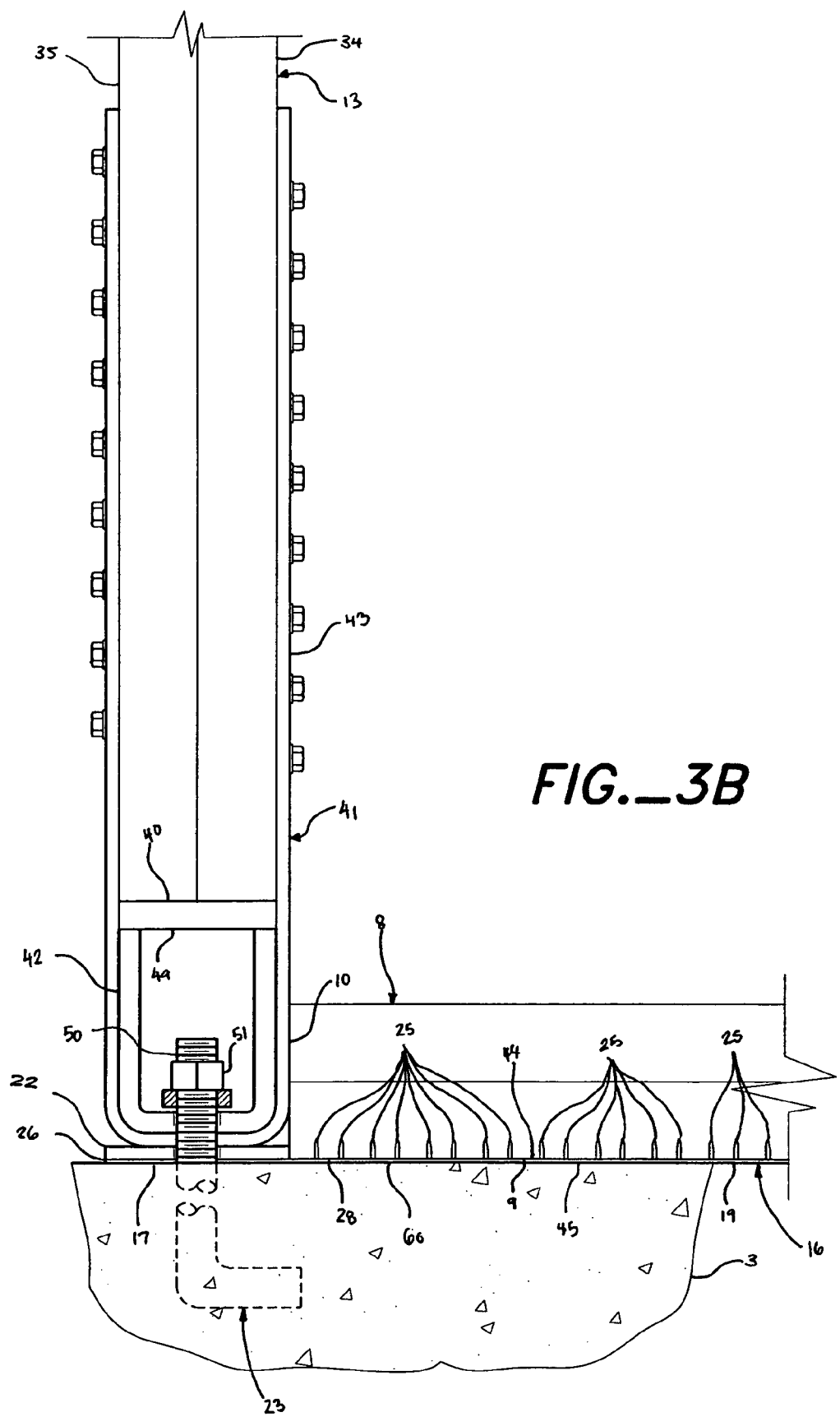
FIG._3B

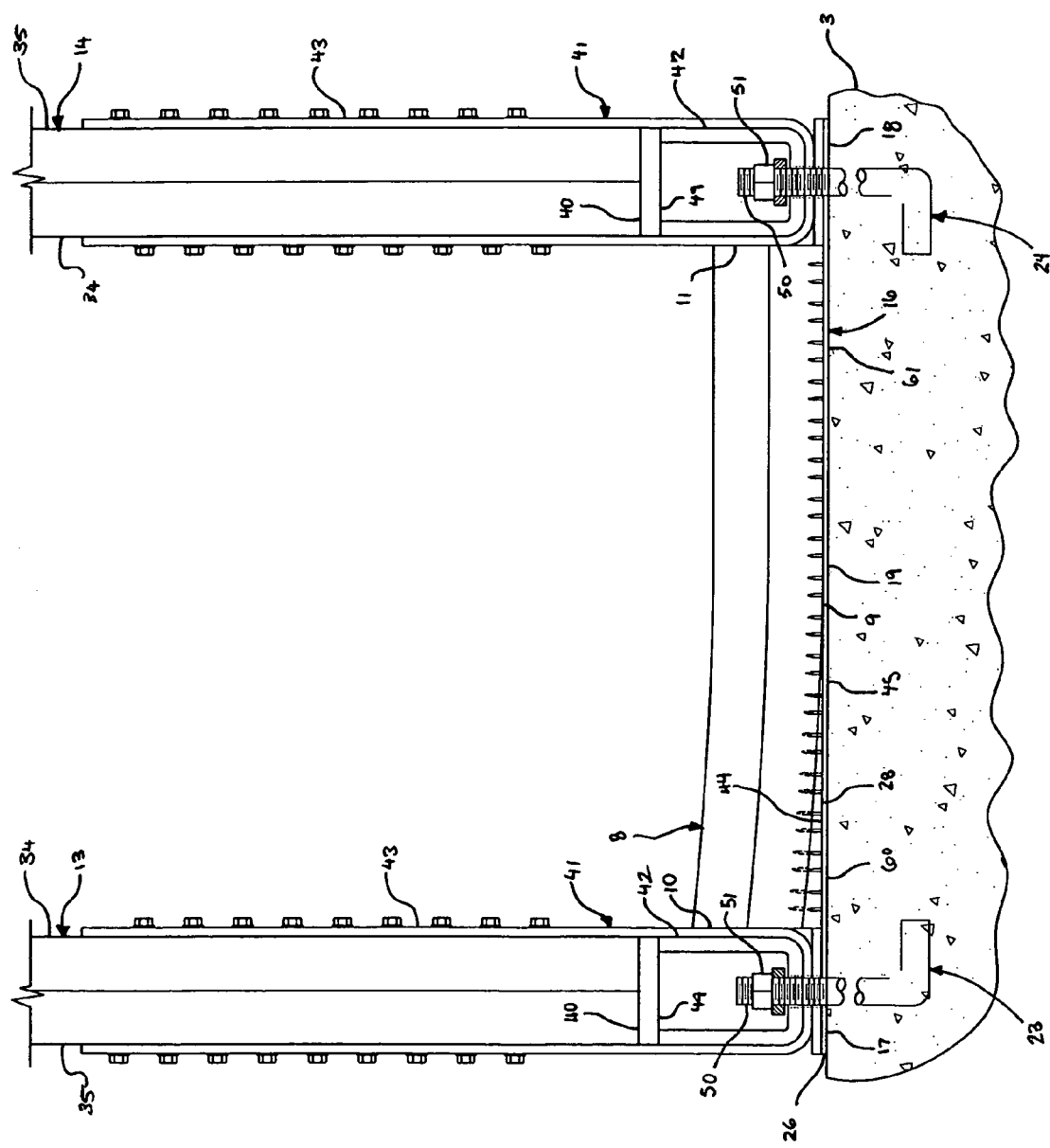

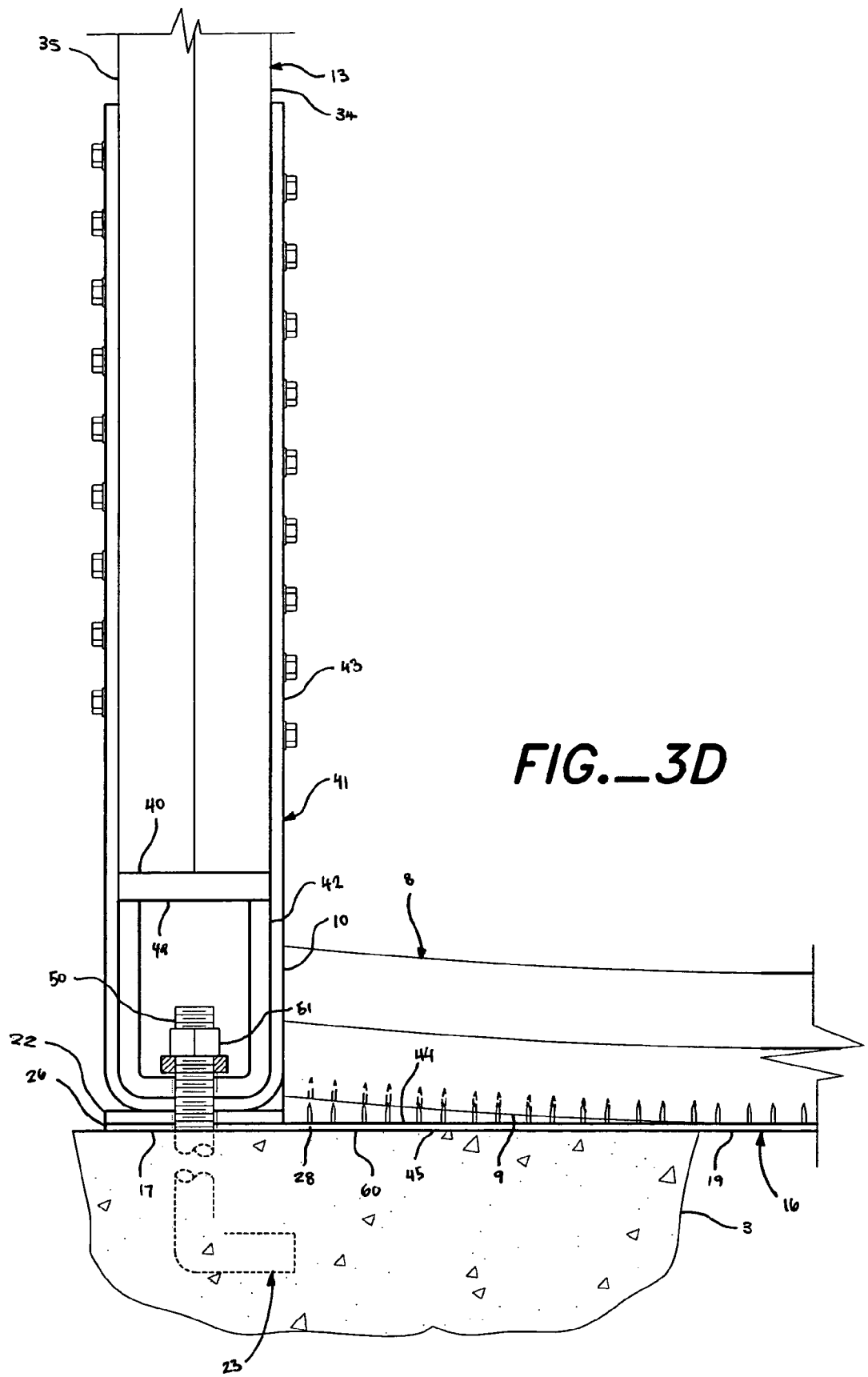
FIG._3D

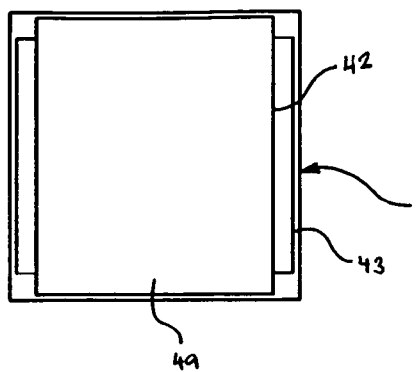
*FIG._4A*
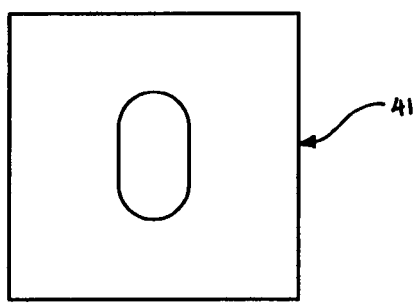
*FIG._4C*
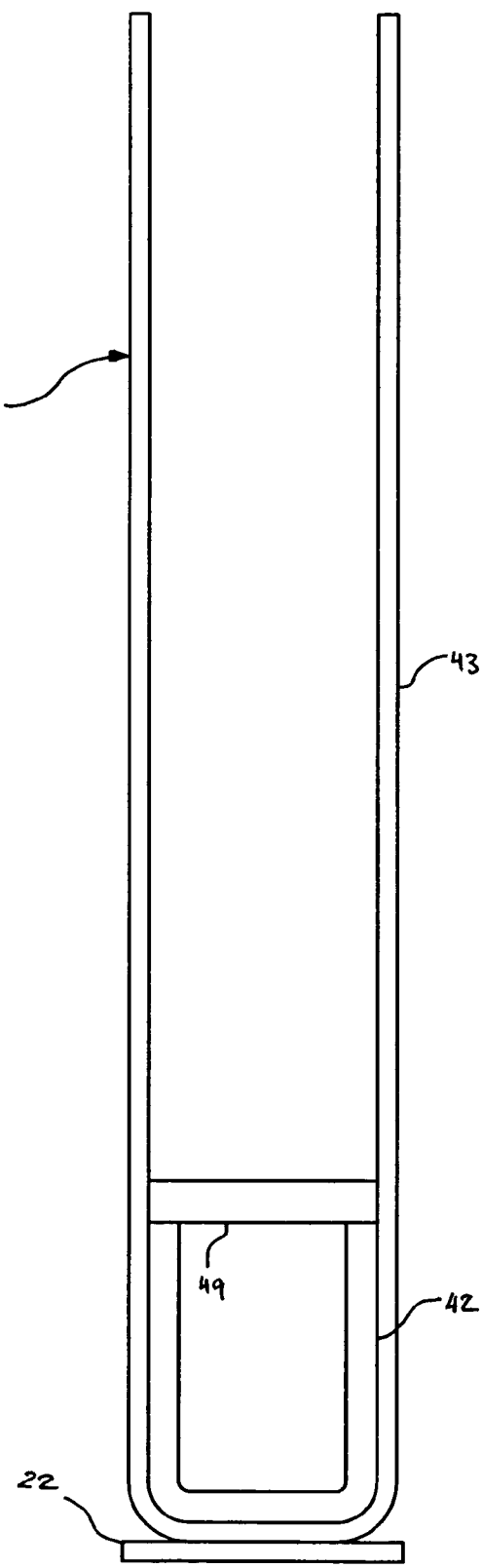
*FIG._4B*

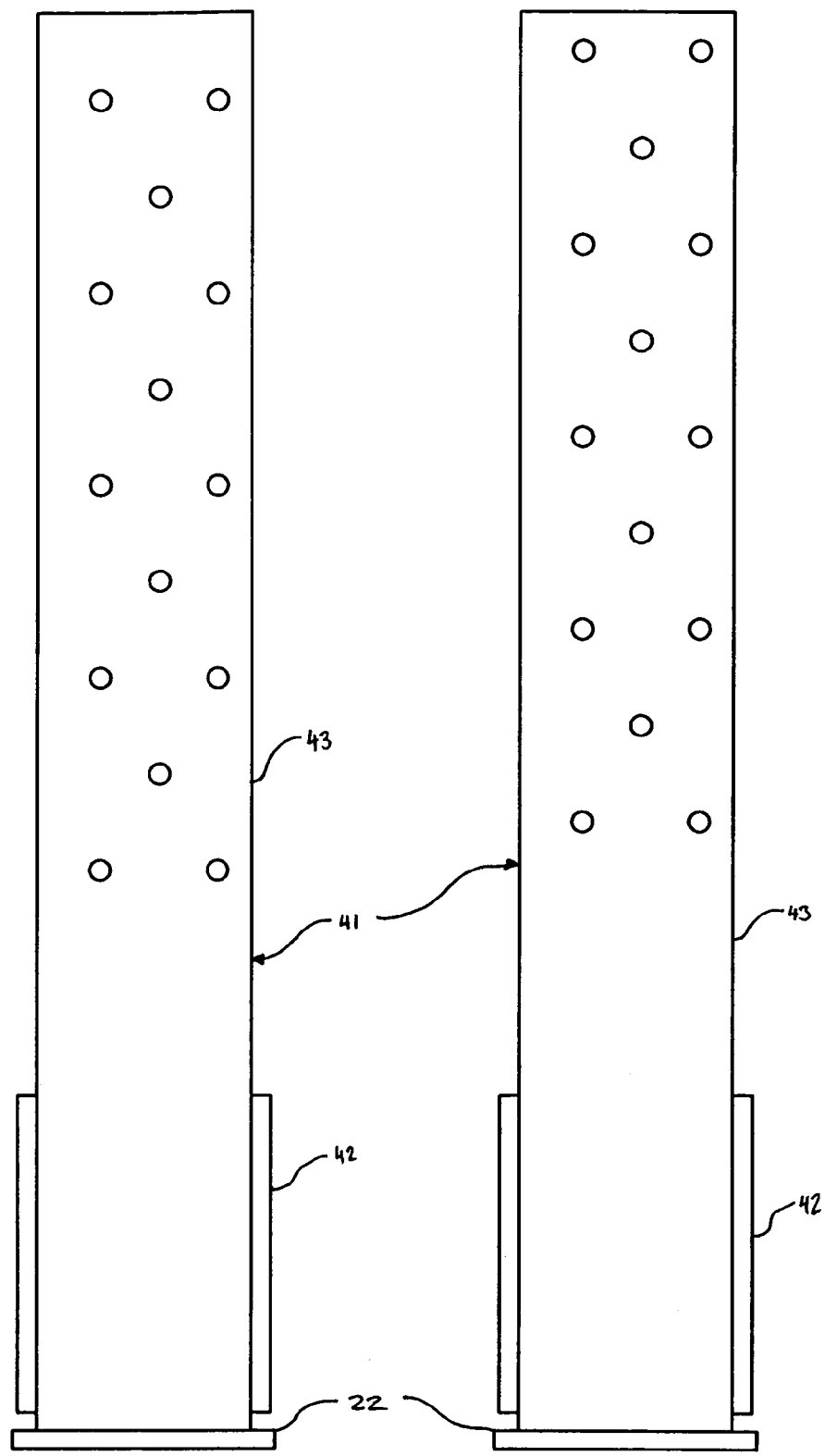
FIG._4D   FIG._4E

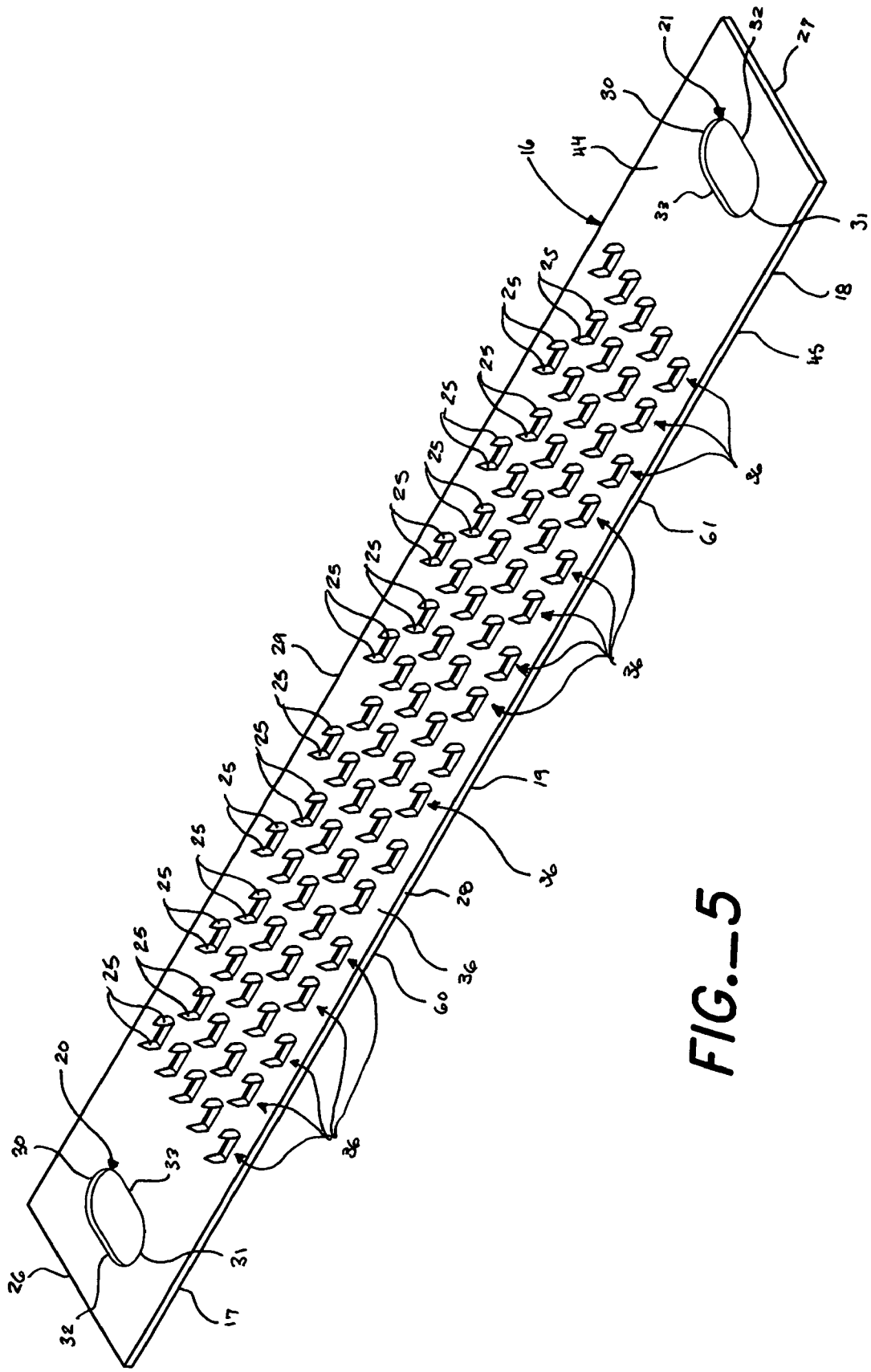
FIG._5

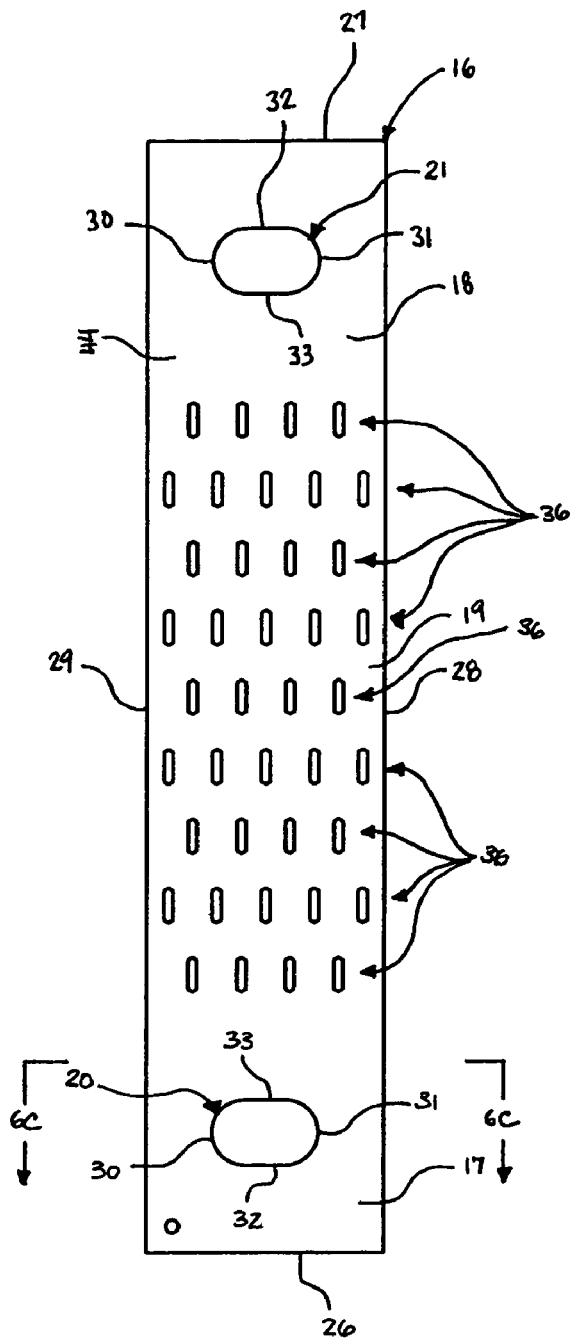
FIG._6A
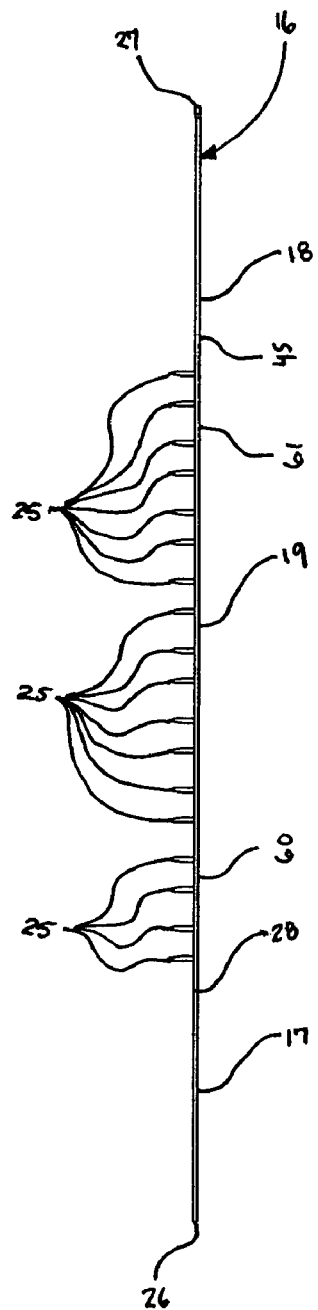
FIG._6B
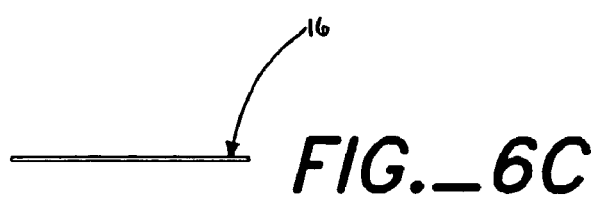
FIG._6C

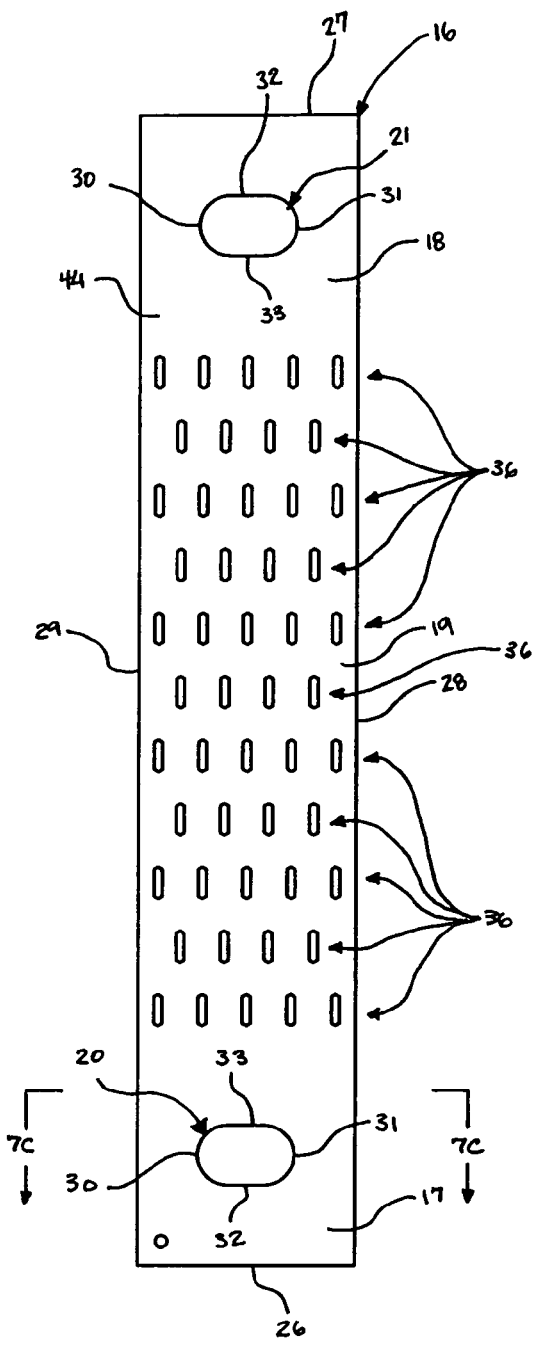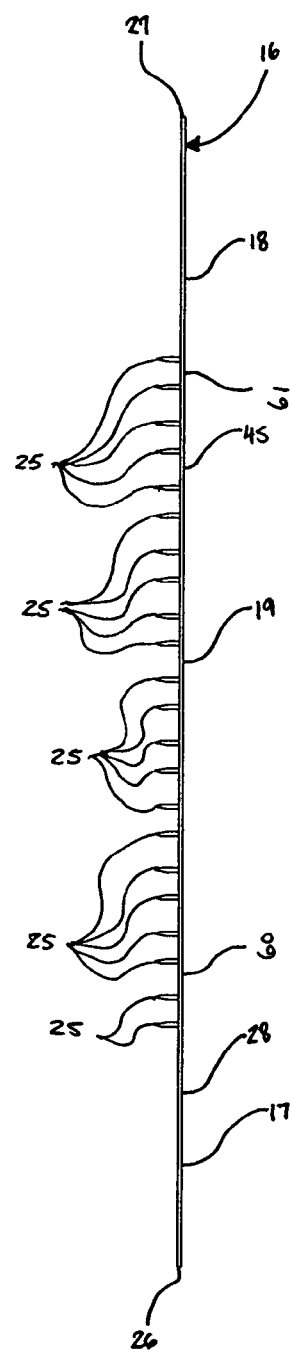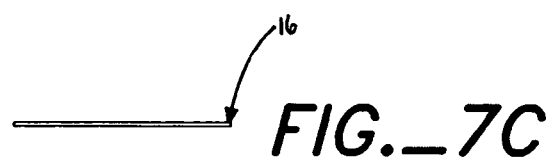
FIG._7A    FIG._7B    FIG._7C

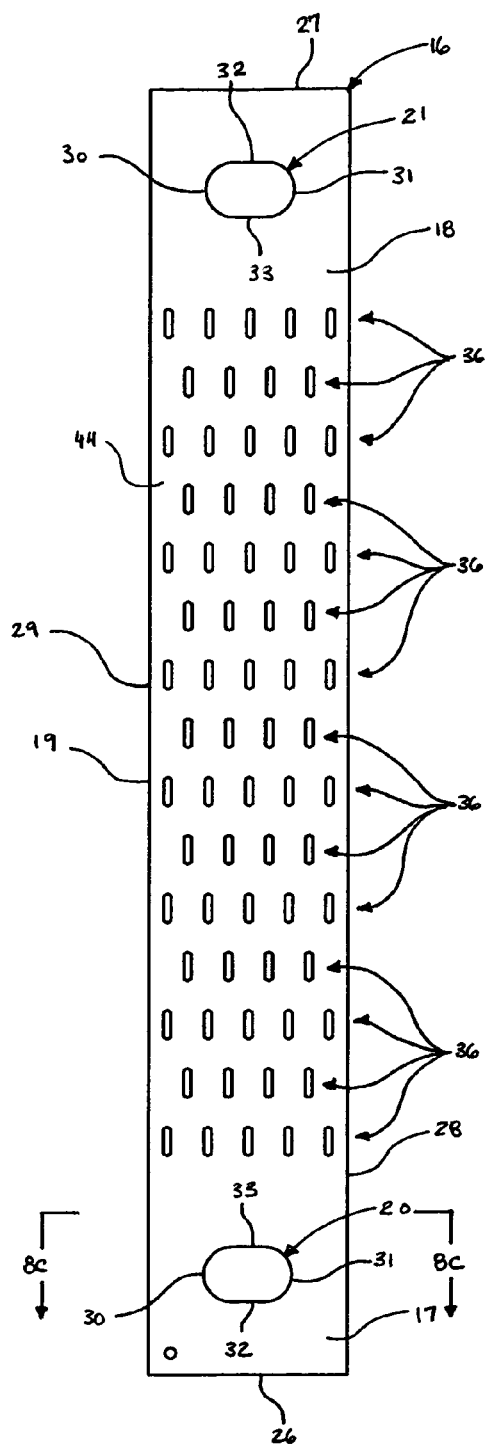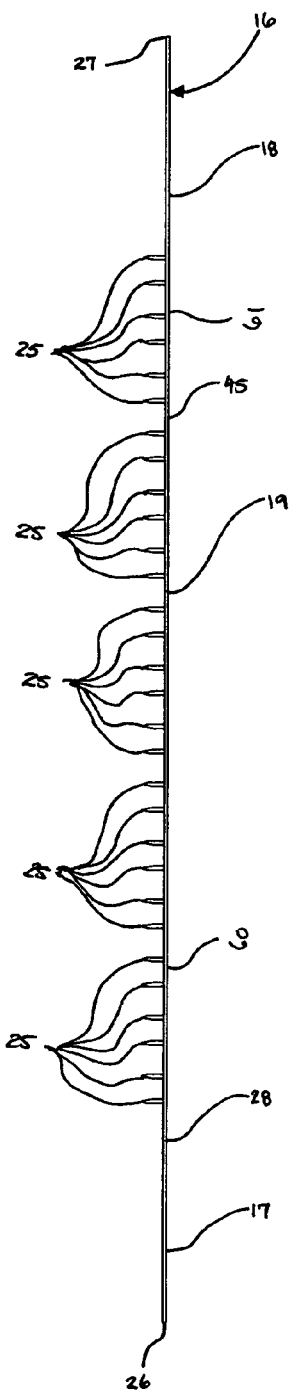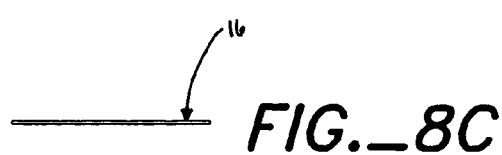
FIG._8A   FIG._8B   FIG._8C

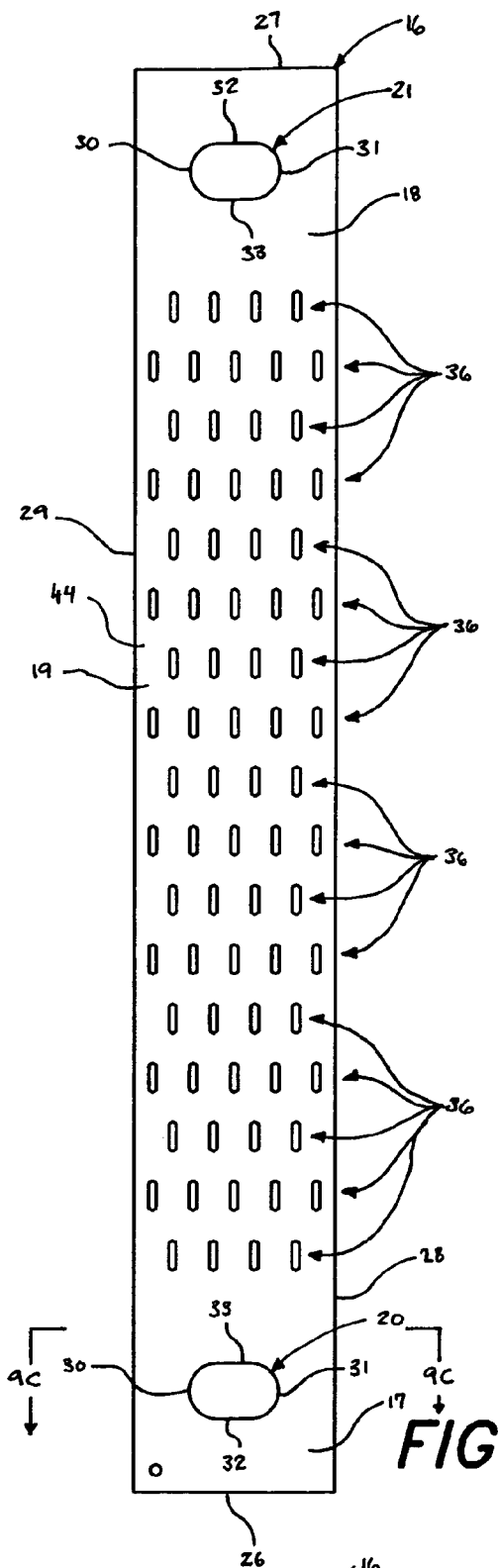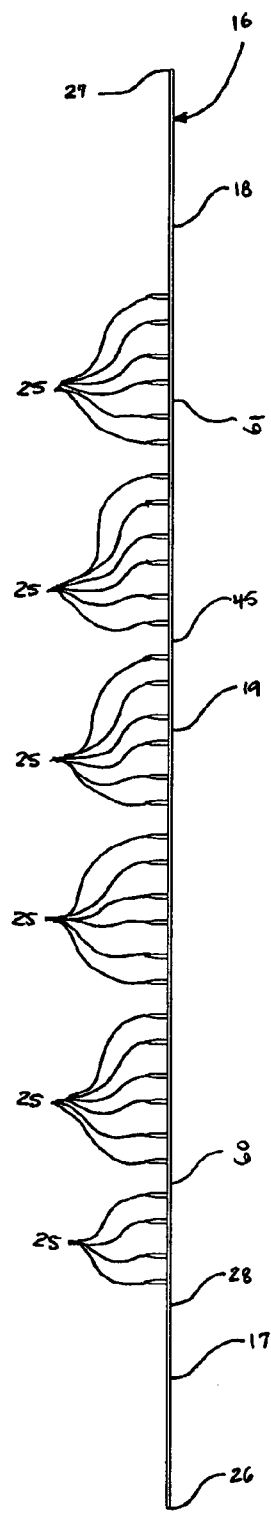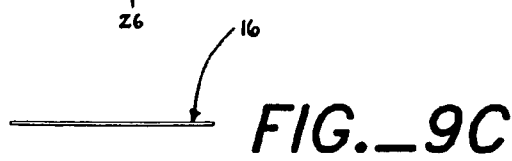
FIG._9A
FIG._9B
FIG._9C

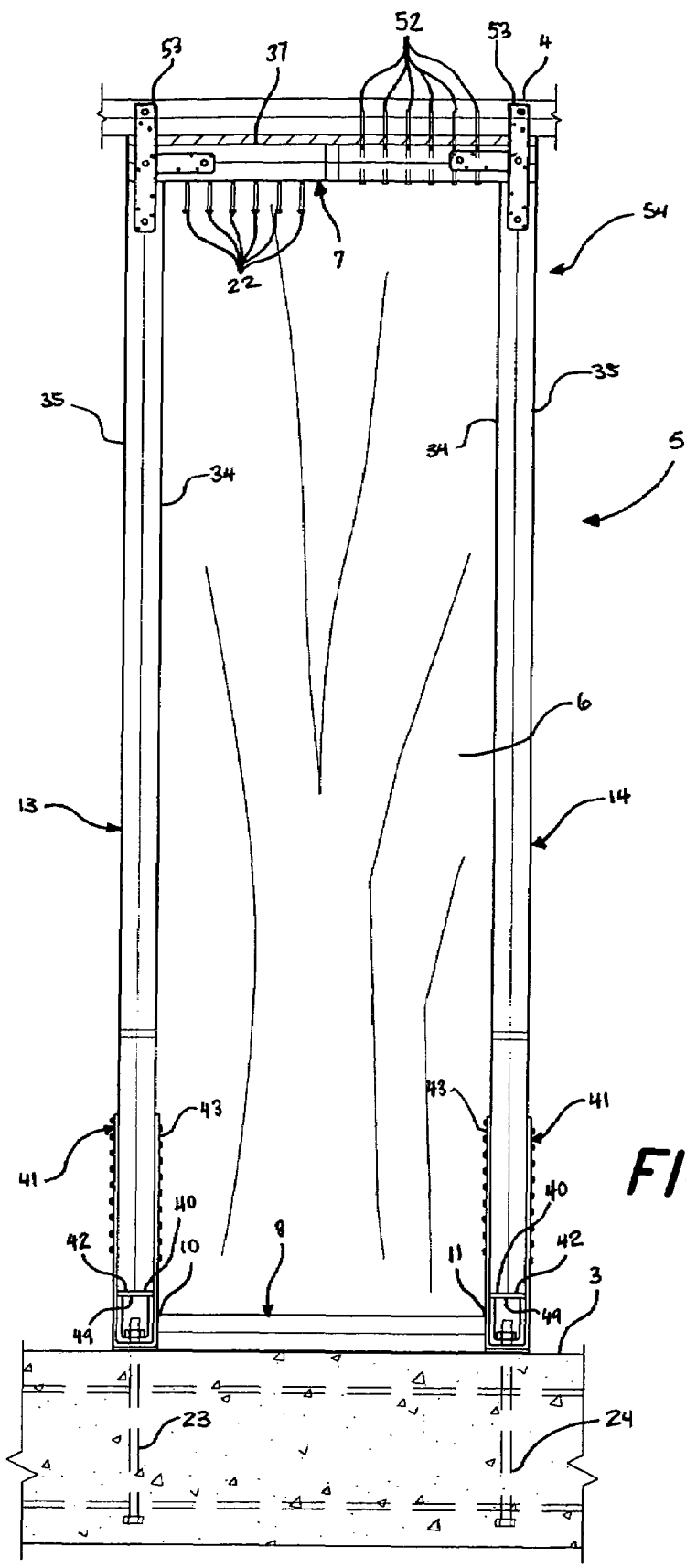
FIG._10A

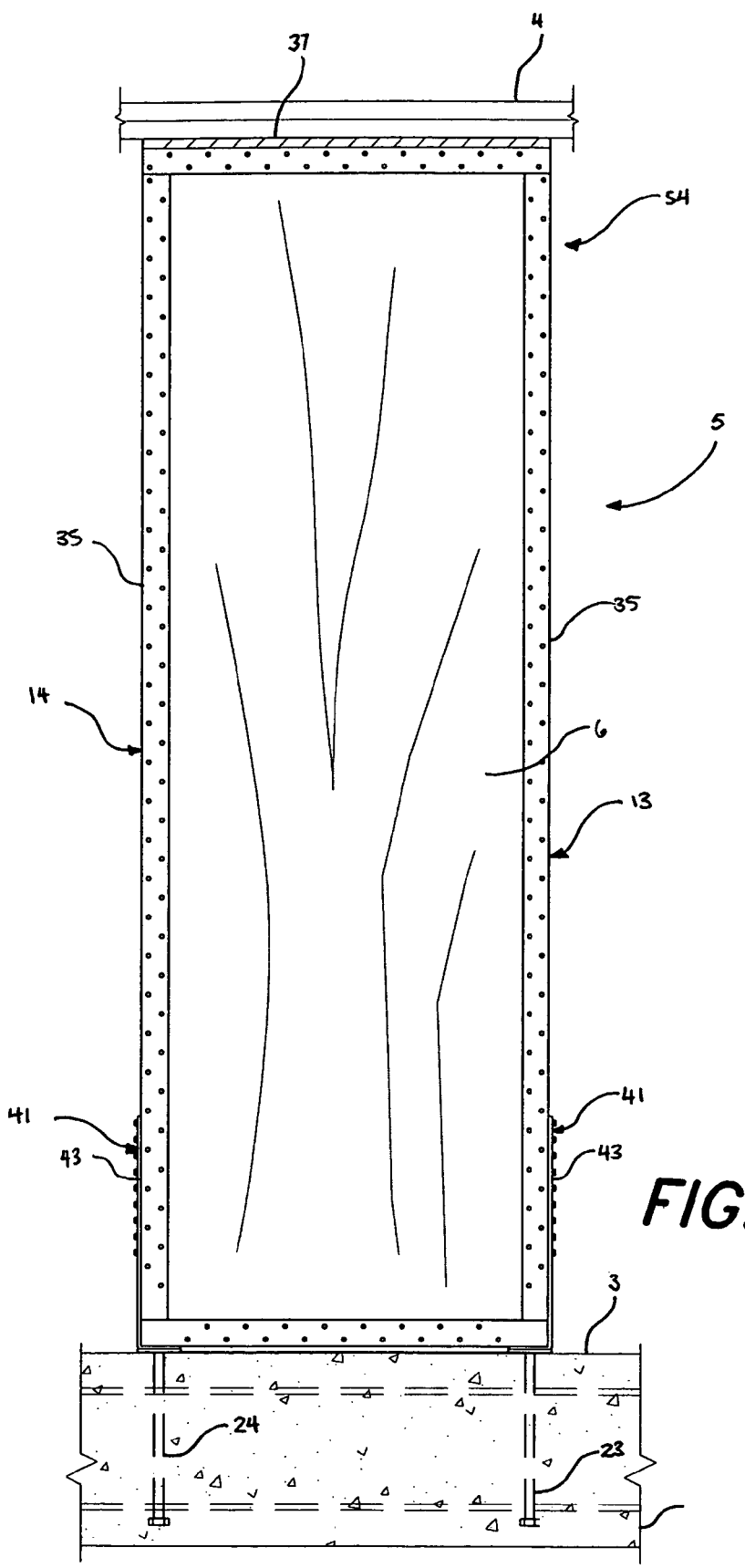
FIG._10B

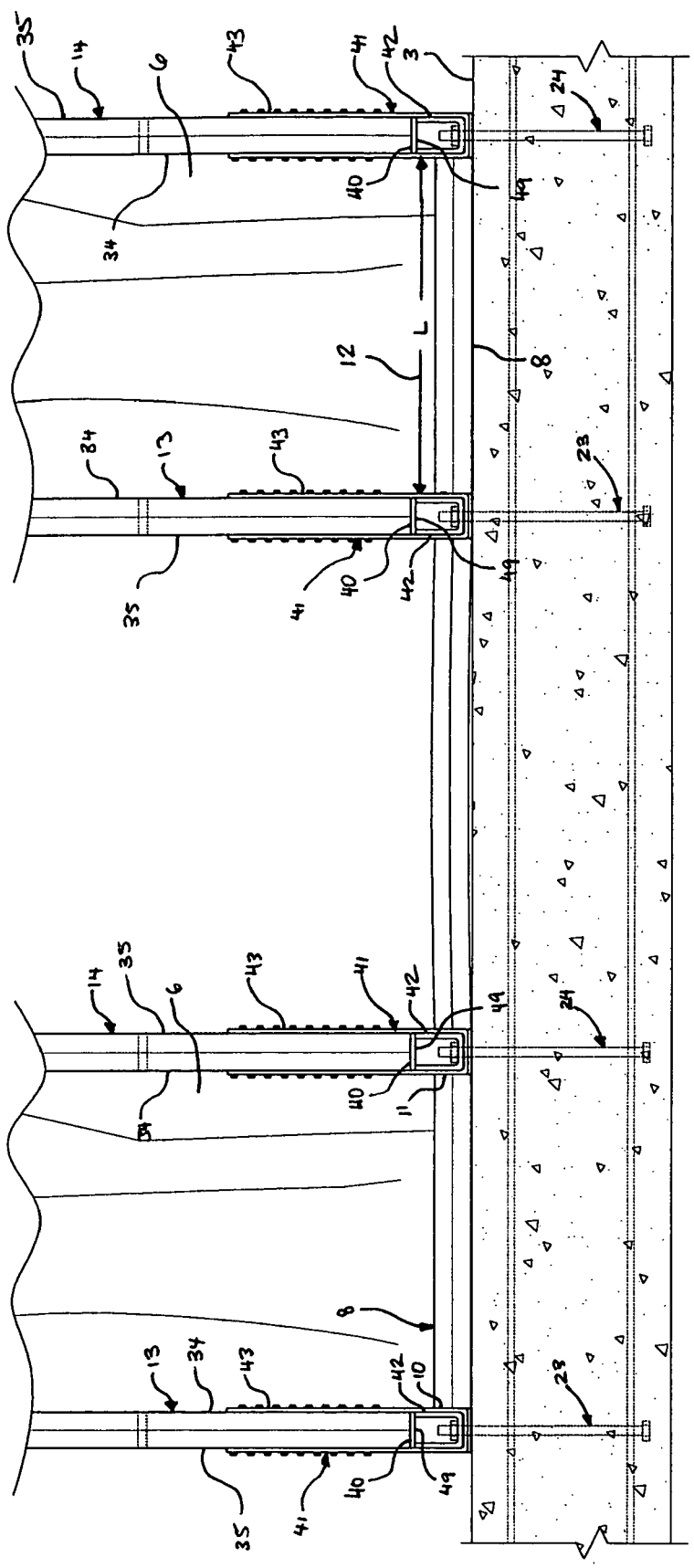
FIG._11

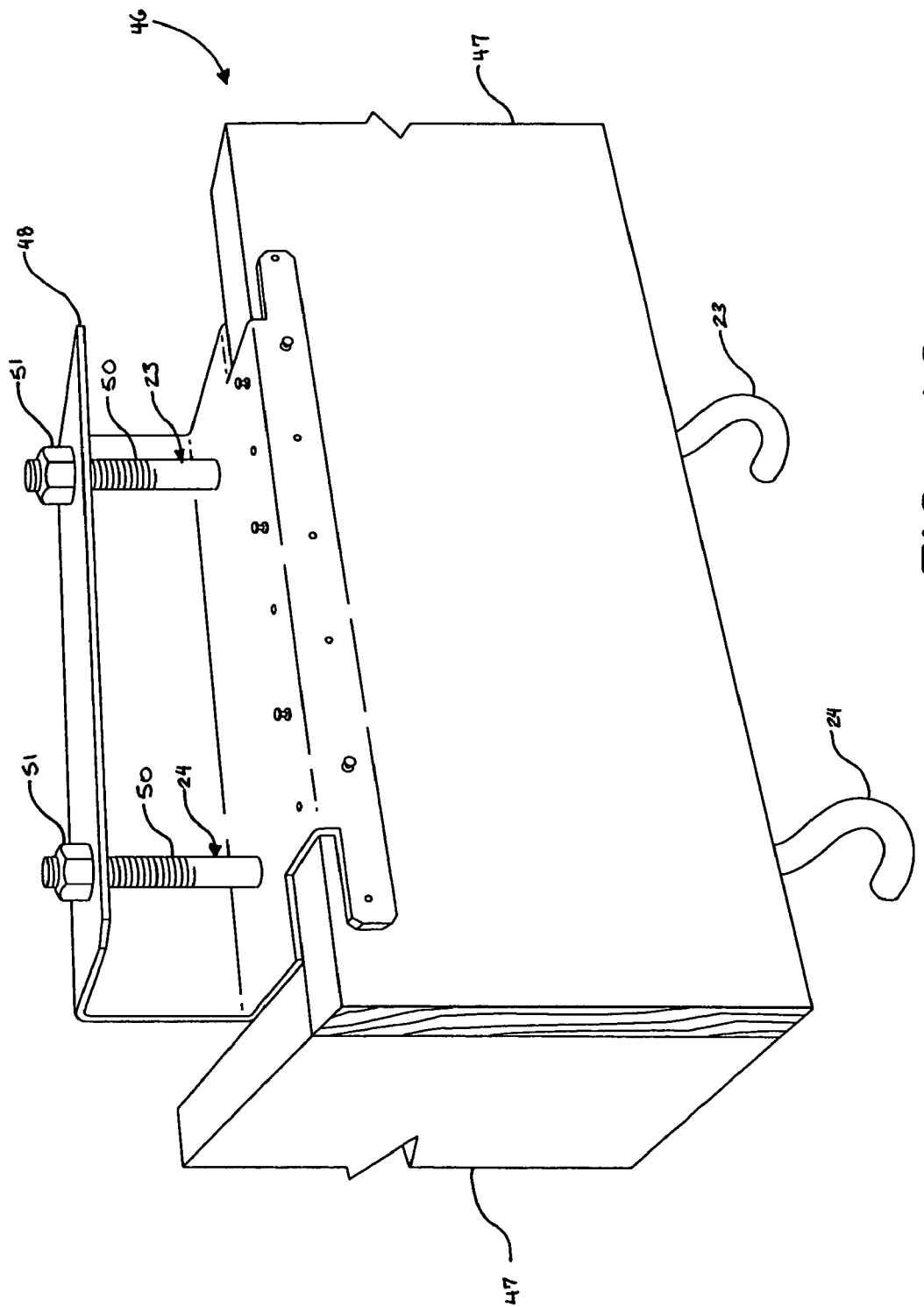
FIG._12

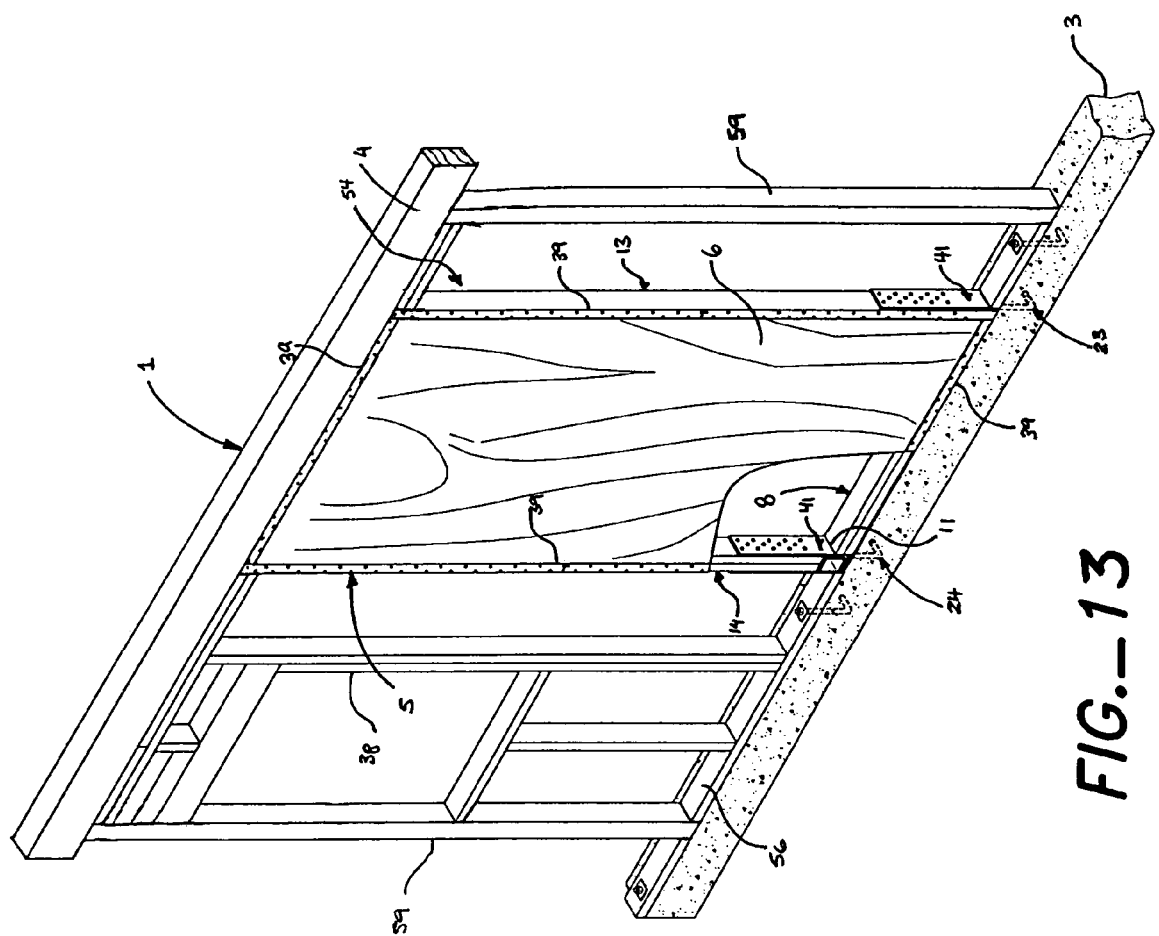
FIG._13

SHEAR TRANSFER PLATE

BACKGROUND OF THE INVENTION

The present invention relates to an improved connection between a wall for resisting lateral forces imposed on a building and the foundation of that building. Specifically, the present invention relates to a shear transfer plate that enhances the transfer of lateral shear forces acting on a wall in a light frame building from the wall into anchor bolts embedded in the concrete foundation. The shear transfer plate is preferably part of a preassembled or prefabricated unitary shearwall subcomponent of the wall, but it can be part of a shearwall that is built on site. The shearwall can be a subcomponent of the wall or it can be the entire wall, commonly created simply by sheathing the wall framing members with plywood, oriented strand board (OSB) or the like. The framing members are typically wood, but light metal framing is now fairly common in some parts of the United States. Whether a subcomponent of a wall, or the entire wall, a shearwall is designed to resist lateral forces imposed on the building such as those caused by an earthquake or by wind loading. A typical example of a preassembled or prefabricated unitary shearwall is the Simpson Strong-Tie Strong-Wall Shearwall.

The present invention improves on preceding wall designs in light frame construction by providing a new and improved method of enhancing the transfer of lateral shear forces to the anchor bolts so that intermediate foundation bolts can be eliminated. Conventionally, a sub-component wall unit has been anchored to the foundation by connecting paired anchor bolts to holdown connectors and by augmenting those anchor bolts with intermediate foundation bolts. The anchor bolts conventionally resist uplift forces and the intermediate foundation bolts conventionally resist lateral shear forces. The present invention makes it possible to use the excess strength of the anchor bolts to resist lateral shear forces as well as uplift forces.

Holdown connectors are conventionally fastened to wall studs. Wall studs that resist uplift in shearwalls are herein generally referred to as posts to differentiate them from wall studs that are not designed to resist uplift. The chords of the shear-resisting assembly are posts, rather than studs, according to this definition. These wall studs can be intermediate between the shearwall posts and they are the primary bearing members for gravity loads in exterior bearing walls of light frame buildings. The anchor bolts are embedded in the concrete with threaded ends extending up through the mudsill. The threaded ends are attached to the holdown connectors with nuts. The anchor bolts are designed to resist uplift. Between the paired anchor bolts, the shorter foundation bolts are similarly anchored in the concrete with threaded ends that extend up through the mudsill where they are attached with nuts and washers. The foundation bolts are designed to resist lateral shear forces. The present invention eliminates the need for foundation bolts by transferring lateral shear forces into the anchor bolts, thereby saving the time and expense of installing intermediate foundation bolts and also reducing the possibility of costly mistakes resulting from mis-installed foundation bolts.

Both posts and studs are typically connected to the bottom sill plate (also called the bottom strut or mudsill) via nails through the sill plate and into the end grain of the post or stud. When uplift forces act on a post or stud, these end grain nail connections offer no meaningful resistance to this uplift. Even if toe nails are used to secure the posts or stud to the bottom sill plate, these are so ineffective at resisting uplift that they are not considered as load paths for uplift forces. Uplift in posts is effectively resisted only if there is a positive mechanical restraint resisting uplift; this mechanical restraint is typically a combination of a holdown connector attached to the post and an anchor restrained by the underlying structure. Unanchored wall studs do not resist uplift unless there is some other mechanical stud-to-plate connector such as a bracket, commonly used in high wind regions. Uplift is introduced into the sill plate primarily because the sheathing is nailed to it in nailed wood structural panel shear walls. As the wall distorts horizontally, the sheathing rotation tends to cause the perimeter nails at the bottom of the sheathing to lift up on the sill plate at various locations depending on the motion of the sheathing rotation. This uplift in the sill is then usually resisted by the shear bolts along the sill. Because the uplift at the sheathing comes in at the side of the sill, and the foundation bolts are in the center of the sill, cross-grain bending of the sill is created, which stresses the wood perpendicular to the grain, and failure of the sill often occurs because wood is so weak when loaded this way. To alleviate this problem, building codes have long required heavy plate washers at foundation bolts. In essence, these plate washers effectively move the uplift resistance afforded by the foundation bolts closer to the edge of the sill plate thus reducing the buildup of cross-grain stresses. In its most preferred embodiments, the present invention does not resist the uplift on the bottom strut, thereby obviating cross grain stresses in the wood. The relatively small amount of bottom strut uplift that is created is reduced by the post-holdown combination to a level that does not cause significant separation of the shear transfer plate from the sill The prior art includes prefabricated shearwalls that eliminate intermediate foundation bolts, but the present invention improves on these designs by providing a shear transfer plate that connects the bottom of the shearwall to the studs only in shear, and by substantially isolating tension and compression forces along the length of the bottom strut into two components, the shear transfer plate and the bottom strut, which act substantially separately, the former in tension and the latter in compression, while remaining mutually connected. Prior art templates superficially similar to the shear transfer plate of the present invention are known, but they are different in both form and function.

For instance, one prior art template is simply a bolt placement template that, like the shear transfer plate of the present invention, lies between the bottom strut of the shearwall and the foundation. It differs from the present invention in that it is not connected to the bottom surface of the bottom strut and, especially, in that it does not eliminate intermediate foundation bolts. On the contrary, its purpose is to position the anchor and foundation bolts, which pass through the template. The template is connected to the bottom strut by the intermediate foundation bolts that pass through both. This does little to enhance the shear connection between the anchor bolts and the bottom strut, and because the bottom strut is connected to the studs, it is subject to significant uplift forces. The bottom strut when lifted is clamped by the foundation bolt connections and is susceptible to breaking against them.

Another prior art template is a complex cut and bent steel member that passes under the studs, extending laterally beyond them to position anchor bolts that are fastened to the outer surfaces of the studs. This template does not pass under the bottom strut, but is instead bent up on either side of the bottom strut, being fastened to the sides of the bottom strut and extending tabs into the underlying concrete foundation along the edge of the shearwall. This template does away with intermediate foundation bolts, but instead of transferring all of the shear loads to the anchor bolts, it supplements the anchor bolts with tabs that can present relatively little shear resistance since they are oriented parallel to the shear forces they are supposed to resist. Furthermore, this template does not isolate the transfer of uplift forces between the studs and the bottom strut, since it passes under the studs and then clamps the bottom strut between its sides.

Another method of eliminating intermediate foundation bolts exists in a shearwall that connects specially formed holdown connectors to the studs above them and directly to the bottom strut by means of an integral flange that is inserted in the bottom strut and fastened to it. This method again fails to isolate the transfer of uplift forces, as it directly ties the bottom strut to the holdown connectors that terminate the lower ends of the studs.

SUMMARY OF THE INVENTION

The present invention improves on prior art modular shearwalls by eliminating foundation bolts and allowing anchor bolts to act not only as uplift anchors but also as shear anchors. Eliminating the additional bolts that are embedded in the concrete foundation speeds installation, making it less expensive. Combined with a direct shear connection between the anchor bolts and the bottom strut, and an uplift connection between the studs and the bottom strut that is mediated by the shear-resisting element, the ductility of the bottom strut connection is enhanced, allowing greater deformation before failure and more gradual failure of the overall connection of the entire shearwall, which reduces the possibility of catastrophic, sudden structural failure and, therefore, danger to a building's occupants.

The present invention is a wall either wholly or partially made from a shear-resisting assembly that has a shear transfer device, or plate, disposed between the bottom strut and the underlying foundation. The shear transfer device joins the two anchor bolts, eliminating intermediate foundation bolts by transferring lateral shear loads to the anchor bolts in combination with the bottom strut.

The present invention is a shear transfer plate that is unitary, interfaces with the greater part of the bottom face of the bottom strut, and is attached to the greater part of the bottom face of the bottom strut with mechanical fasteners that penetrate but preferably do not pass through the bottom strut.

In one embodiment, the shear transfer plate of the present invention uses integral nail prongs to attach to the bottom face of the bottom strut. The bottom strut is made of wood.

In one embodiment, the shear transfer plate of the present invention has obround anchor bolt openings that give the shear-resisting assembly a degree of adjustability when it is placed over the anchor bolts. The obround anchor bolt openings are oriented so that the adjustability is primarily forward and back rather than side-to-side. The obround openings are dimensioned so that, when correctly placed, the outer sides are in contact with the anchor bolts while the inner sides are not, allowing the shear transfer plate to act essentially only in tension while the bottom strut acts primarily in compression.

In one embodiment, the shear-resisting assembly of the present invention has first and second vertical chords, posts, that rest on concentric holdowns.

In one embodiment, the shear-resisting element of the present invention is a panel, typically plywood, oriented strand board, or the like. Other shear-resisting elements such as cross braces could be used.

In one embodiment, the underlying structural component of the present invention is a concrete foundation, although other cementitious materials or structural members might be used.

In one embodiment, the shear transfer plate of the present invention is made of metal, typically light galvanized sheet steel, but it could be made of other metals or materials with similar performance characteristics, or it could be made from heavy gauge steel or the like.

In one embodiment, the shear-resisting assembly of the present invention is a modular, prefabricated structure.

In one embodiment, the shear-resisting assembly of the present invention responds to racking shear loads by allowing the bottom strut and the shear transfer plate to separate at one end and then the other, the bottom strut being compressed and the shear transfer plate that acts primarily in tension.

The present invention includes wall framing.

The chords of the shear-resisting assembly of the present invention can rest on the underlying foundation, or on concentric holdowns that tie the chords to the anchor bolts in the foundation, so that the shear transfer plate extends beyond the ends of the enclosed bottom strut and under the chords. Alternatively, the chords rest on the bottom strut and connect to the anchor bolts either with concentric holdowns that rest on the bottom strut or with eccentric holdowns that are mounted to the outer or inner sides of the chords.

In one embodiment, the anchor bolts of the present invention are embedded in the cementitious underlying structural component, the shear-resisting assembly is placed over the embedded anchor bolts, typically after the concrete has set, the anchor bolts are attached to the bottom of the shear-resisting assembly, and the top of the shear-resisting assembly is attached to the generally horizontal structural member, typically either a top plate or beam, above it.

The present invention can be a wall in post-and-beam construction as well as, or as an alternative to, a standard wall including a mudsill, wall studs and a top plate.

BRIEF DESCRIPTION OF THE DRAWINGS

FIG. 1A is a perspective view of a wall including the shear-resisting assembly of the present invention.

FIG. 1B is a perspective view a building including walls made in accordance with the present invention.

FIG. 2A is a perspective view of the inside of a shear-resisting assembly of the present invention, looking downward.

FIG. 2B is a perspective view of the lower portion of a shear-resisting assembly of the present invention showing how the shear-resisting element of the present invention is applied.

FIG. 2C is a perspective view of the inside of a shear-resisting assembly of the present invention, looking upward.

FIG. 2D is a perspective view of the outside of a shear-resisting assembly of the present invention, looking downward.

FIG. 2E is a perspective view of the outside of a shear-resisting assembly of the present invention, looking upward.

FIG. 3A is a front elevation view of the lower portion of a shear-resisting assembly of the present invention.

FIG. 3B is a front elevation view of a lower corner of a shear-resisting assembly of the present invention.

FIG. 3C is a front elevation view of the lower portion of a shear-resisting assembly of the present invention, showing the behavior of the bottom strut and shear-resisting element under heavy racking loads.

FIG. 3D is a front elevation view of a lower corner of a shear-resisting assembly of the present invention, showing the behavior of the bottom strut and shear-resisting element under heavy racking loads.

FIG. 4A is a top plan view of the preferred holdown of the present invention.

FIG. 4B is a front elevation view of the preferred holdown of the present invention.

FIG. 4C is a bottom plan view of the preferred holdown of the present invention.

FIG. 4D is a side elevation view of the preferred holdown of the present invention.

FIG. 4E is a side elevation view of the preferred holdown of the present invention.

FIG. 5 is a perspective view of the shear-resisting element of the present invention, looking downward.

FIG. 6A is a bottom plan view of a preferred embodiment of the shear-resisting element of the present invention.

FIG. 6B is a front elevation view a preferred embodiment of the shear-resisting element of the present invention.

FIG. 6C is a cross-sectional view a preferred embodiment of the shear-resisting element of the present invention, taken along lead line 6C in FIG. 6A.

FIG. 7A is a bottom plan view of a preferred embodiment of the shear-resisting element of the present invention.

FIG. 7B is a front elevation view a preferred embodiment of the shear-resisting element of the present invention.

FIG. 7C is a cross-sectional view a preferred embodiment of the shear-resisting element of the present invention, taken along lead line 7C in FIG. 7A.

FIG. 8A is a bottom plan view of a preferred embodiment of the shear-resisting element of the present invention.

FIG. 8B is a front elevation view a preferred embodiment of the shear-resisting element of the present invention.

FIG. 8C is a cross-sectional view a preferred embodiment of the shear-resisting element of the present invention, taken along lead line 8C in FIG. 8A.

FIG. 9A is a bottom plan view of a preferred embodiment of the shear-resisting element of the present invention.

FIG. 9B is a front elevation view of a preferred embodiment of the shear-resisting element of the present invention.

FIG. 9C is a cross-sectional view of a preferred embodiment of the shear-resisting element of the present invention, taken along lead line 9C in FIG. 9A.

FIG. 10A is a front elevation view of the inside of a shear-resisting assembly of the present invention, showing how self-drilling screws are used to connect it to the generally-horizontal member above.

FIG. 10B is a front elevation view of the outside of a shear-resisting assembly of the present invention, showing how it is anchored to the underlying structural component.

FIG. 11 is a front elevation view of a pair of shear-resisting assemblies of the present invention, separated by a mudsill and anchored to a concrete foundation.

FIG. 12 is a perspective view of an anchor bolt template attached to a formboard.

FIG. 13 is a perspective view of a post-and-beam wall including the shear-resisting assembly of the present invention.

DETAILED DESCRIPTION OF THE INVENTION

As best shown in FIGS. 1A and 1B, preferably, the present invention is a wall 1 designed to resist lateral forces imposed on a building 2 incorporating that wall 1. The building 2 has an underlying structural component 3 supporting the wall 1 and a generally horizontal structural member 4, through which lateral shear forces are transmitted, surmounting the wall 1.

The wall 1 is typically a light wood-frame wall 1 in a light wood-frame building 2, but it could also be light-gauge steel, which is increasingly common particularly in areas where the cost of wood is high, either because the wood must be imported or because local weather conditions increase the cost of maintenance of wood-frame structures. Other structural materials are also possible. Lateral forces are typically those exerted by high winds or earthquakes, the former tending to be fairly consistent in the amount of force and its direction, the latter tending to be stronger, cyclical, and reversing direction. Walls 1 are generally designed to resist lateral forces parallel to the plane of the wall 1, using either cross-bracing in the form of metal straps running from corner to corner or panels such as plywood sheathing nailed across the vertical wall studs. The underlying structural component 3 is typically a concrete foundation wall or concrete foundation slab, although other materials might be used. The generally horizontal structural member 4 is typically a double-ply wood top plate, but it could also be a header or other floor or roof-supporting structure.

The wall 1 preferably includes a shear-resisting assembly 5 that is connected to the generally horizontal structural member 4 and also to the underlying structural component 3. The wall 1 is disposed between the generally horizontal structural member 4 and the underlying structural component 3.

As best shown in FIGS. 2A, 2C-2E, 10A and 10B, preferably, the shear-resisting assembly 5 includes a shear-resisting element 6, a top strut 7, a bottom strut 8, a first chord 13, a second chord 14, means 15 for connecting the shear-resisting element 6 to a plurality of the top strut 7, the bottom strut 8, the first chord 13 and the second chord 14, and a shear transfer device 16. The top strut 7 is preferably disposed substantially parallel to the generally horizontal structural member 4. The bottom strut 8 has a bottom face 9, a first end 10 and a second end 11 and a distance 12 between the first and second ends 10 and 11, the distance 12 constituting a selected length 12 of the bottom strut 8. The bottom strut 8 is disposed lengthwise substantially parallel to the underlying structural component 3. Preferably, the first chord 13 is connected to the top strut 7 and the shear-resisting element 6. The second chord 14 is preferably connected to the top strut 7 and the shear-resisting element 6.

As best shown in FIGS. 5-9C, preferably the shear transfer device 16 includes a first substantially planar end portion 17, a first substantially planar inner portion 60, a second substantially planar end portion 18, and a second substantially planar inner portion 61. Preferably, the first substantially planar end portion 17 has a first anchor opening 20, and the first end portion 17 is proximate the first end 10 of the bottom strut 8. Preferably, the first substantially planar inner portion 60 is joined to the first end portion 17 and, in substantially the same plane, the first inner portion 60 is disposed between the bottom strut 8 and the underlying structural component 3. The first inner portion 60 interfaces with the bottom face 9 of the bottom strut 10 and is fastened to the bottom face 9 of the bottom strut 10. Preferably, the second substantially planar end portion 18 has a second anchor opening 21 and the second end portion 18 is proximate the second end 11 of the bottom strut 8. A second substantially planar inner portion 61 is joined to the second end portion 18 and, in substantially the same plane, the second inner portion 61 is disposed between the bottom strut 8 and the underlying structural component 3.

The second inner portion 61 interfaces with the bottom face 9 of the bottom strut 8 and is fastened to the bottom face 9 of the bottom strut 8.

Preferably, a plurality of the top and bottom struts 7 and 8 and the first and second chords 13 and 14 form a supporting frame 54 for the shear-resisting element 6. A first anchor bolt 23 passes through the first anchor opening 20 and connects the shear-resisting assembly 5 to the underlying structural component 3 of the building 2. A second anchor bolt 24 passes through the second anchor opening 21 and connects the shear-resisting assembly 5 to the underlying structural component 3 of the building 1.

As best shown in FIGS. 5-9C, preferably, the shear transfer device 16 is a shear transfer plate 16 in which the first inner portion 60 and the second inner portion 61 join between the first end portion 17 and the second end portion 18 to form a middle portion 19. Preferably, the shear transfer plate 16 is a single-piece, unitary member. The shear transfer plate 16 preferably interfaces with the bottom face 9 of the bottom strut 8 along most of the length 12 of said bottom face 9 of the bottom strut 8.

As best shown in FIGS. 2C, 2E and 3A, the shear transfer device 16 is preferably fastened to the bottom face 9 of the bottom strut 8 along most of the length 12 of the bottom face 9 of the bottom strut 8.

Preferably, the shear transfer plate 16 is fastened to the bottom face 9 of the bottom strut 8 with mechanical fasteners 25, although adhesives might also be used if suitable. The mechanical fasteners 25 can be nails, screws, bolts or the like, but all of these have the obvious disadvantage that they would protrude from the shear transfer plate 16 and come between it and the underlying structural component 3. Preferably, the mechanical fasteners 25 penetrate the bottom face 9 of the bottom strut 8 but do not pass through the bottom strut 8. Although other forms of integral fasteners 25 can be formed, the preferred mechanical fasteners 25 are integral nail prongs 25 formed from the material of the shear transfer plate 16. The nail prongs 25 are preferably punched or cut from the material of the shear transfer plate 16 so that they are generally V-shaped or at least concave-convex in transverse section and tapering, making them rigid and sharp, respectively. The bottom strut 8 is preferably made of wood.

As best shown in FIGS. 5-9C, the first and second anchor openings 20 and 21 are preferably obround, each having a first rounded end 30, a second rounded end 31, an outer side 32 and an inner side 33. Preferably, the first and second anchor openings 20 and 21 are oriented so that the first rounded ends 30 face one of the first and second sides 28 and 29 of the shear transfer plate 16 and the second rounded ends 31 face another of the first and second sides 28 and 29 of the shear transfer plate 16. This orientation is intended to give the shear-resisting assembly 5 a degree of lateral adjustability to accommodate lateral misalignment of the first and second anchor bolts 23 and 24 within the underlying structural component 3. The first and second anchor openings 20 and 21 are preferably dimensioned so that the outer sides 32 are in contact with the first and second anchor bolts 23 and 24 received by the first and second anchor openings 20 and 21. Preferably, the first and second anchor openings 20 and 21 are dimensioned so that the inner sides 33 are not in contact with the first and second anchor bolts 23 and 24 received by the first and second anchor openings 20 and 21. The anchor openings 20 and 21 are so dimensioned so that, ideally installed, the shear transfer plate 16 will pull on the anchor bolts 23 and 24 but not push against them when shear loads are applied.

As best shown in FIGS. 3A and 3C, preferably, the first and second chords 13 and 14 of the wall 1 rest on holdowns 41 that are supported by the underlying structural component 3. This arrangement ensures that the shear-resisting assembly 5 works as most preferred. The shear forces acting in the plane of the panel 6 effectively push at the top or bottom of the shear-resisting assembly 5, tending to overturn it. One of the first and second chords 13 and 14 compresses the shear transfer plate 16 under it, while the other of the first and second chords 13 and 14 pulls upward against the corresponding first or second anchor bolt 23 or 24. Preferably, there is no direct connection between the bottom strut 8 and either the first and second chords 13 and 14 or the holdowns 41. The connection is through the panel 6, which is preferably fastened to the top strut 7, bottom strut 8, first chord 13 and second chord 14 with means 15 that are preferably a plurality of nails 15. Preferably, the connections of the nails 15 are reinforced with perimeter edging 39. When shear loads are applied and the shear-resisting assembly 5 attempts to overturn, the uplift is resisted by one of the first and second anchor bolts 23 and 24, but there is a degree of movement that is transmitted through the panel 6 to the bottom strut 8. One of the first and second ends 10 and 11 of the bottom strut 8 tends to lift while the other of the first and second ends 10 and 11 presses down on the shear transfer plate 16.

As best shown in FIGS. 3A and 3C, the first and second chords 13 and 14 are firmly anchored to the underlying structural component 3 and resist uplift forces with negligible movement in compliance with those uplift forces. A greater degree of movement in compliance with uplift forces is desirable in the connection of the bottom strut 8, which is subject to some uplift forces. In the prior art, the bottom strut 8 was bolted to the underlying structural component 3 with foundation bolts. These bolted connections tended to break the bottom strut 8 under heavy uplift forces as they acted like clamps that fixed the edge of the bottom strut 8 on the side opposite the shear-resisting element 6 (the shear-resisting element 6 can be called a diaphragm 6, but the term "diaphragm" can be used to refer collectively to the shear-resisting element 6 and the frame around it, so the shear-resisting element is herein referred to as a panel 6). The solution with foundation bolts was to use oversized washers to effectively make the clamping effect cover the whole width of the bottom strut 8. This, of course, adds material and time to the installation. The shear transfer plate 16 of the present invention is preferably pre-attached, saving time, and allows for a degree of compliant movement in the bottom strut 8, which is less restrained against uplift forces and is adequately restrained against shear forces without foundation bolts and attendant additional hardware.

As best shown in FIGS. 3C and 3D, under heavy loading, and depending on the downforce weighing on the shear-resisting assembly 5, the lift of one of the first and second ends 10 and 11 causes the nail prongs 25 embedded in the bottom face 9 of that end, and only that end, of the bottom strut 8 to withdraw because the shear transfer plate 16 is compressed at the opposite end and under the adjacent of the first and second chords 13 and 14. When the load reverses, the nail prongs 25 reenter the bottom face 9 of the bottom strut 8 and the entire response of the shear-resisting assembly 5 is reversed. Because the shear transfer plate 16 and the bottom strut 8 are able to separate, the bottom strut 8 is not perfectly rigid even while the connections to the first and second anchor bolts 23 and 24 give as little as possible, and the shear-transfer plate 16 remains level. The forces transmitted into and out of the bottom strut 8, as well as into and out of the top strut 7, and the first and second chords 13 and 14, are therefore distributed to and dissipated by the connections to the plurality of nails 15 that fasten the panel 6 to these members, rather than to a smaller number of rigid connections. This means that failure tends to be gradual rather than catastrophic, partial rather than complete.

As best shown in FIGS. 2A-2D, 10A, 10B and 11, in the most preferred embodiment, the shear-resisting element 6 is at least one panel. Preferably, the panel shear-resisting element 6 is either a single sheet of oriented strand board (OSB) or plywood, fastened to at least two, but preferably to all four of the members of the supporting frame 54. Multiple panel diaphragms can be used, so long as each is fastened to at least two of the members of the supporting frame 54. Preferably, the underlying structural component 3 is cementitious. Most preferably, the underlying structural component 3 is a concrete foundation. The shear transfer plate 16 of the present invention is preferably made of sheet metal.

As best shown in FIGS. 1A-2E, 10A and 10B, preferably, the shear-resisting assembly 5 of the present invention is a modular, prefabricated structure. A modular shear-resisting assembly 5 can be placed on the foundation 3 before or after a stick wall 1 is built around it and prefabrication allows for a degree of quality control that is difficult to achieve in the field. However, the shear-resisting assembly 5 can be built as part of the wall 1 and can even constitute all of the wall 1. Prior to the use of prefabricated components, a shear-resisting wall 1 would be constructed by framing the wall 1 and then sheathing it with plywood or the like to provide shear resistance. This is not necessarily different from prefabricated shear-resisting assemblies 5 and, moreover, the two can be used together and often are, by including a prefabricated shear-resisting assembly 5 in a stick wall 1 reinforced with plywood sheathing.

As best shown in FIG. 2B, preferably, the shear transfer plate 16 has a first end 26, a second end 27, a first side 28 and a second side 29. Preferably, the shear transfer plate 16 is a rectangle that matches the bottom face 9 of the bottom strut 8, if the lower ends 40 of the first and second chords 13 and 14 end above the bottom strut 8, in which case holdowns 41 would most probably be mounted on the inner sides 34 of the first and second chords 13 and 14. More preferably, the shear transfer plate 16 is a rectangle that matches the bottom face 9 of the bottom strut 8 and the lower ends 40 of the first and second chords 13 and 14, when the first and second chords 13 and 14 stand directly on the shear transfer plate 16 or are supported by concentric holdowns 41 that in turn stand on the shear transfer plate 16. The shear transfer plate 16 could be extended beyond the first and second chords 13 and 14 if, for instance, if the holdowns 41 were mounted on the outer sides 35 of the first and second chords 13 and 14.

As best shown in FIGS. 3C and 3D, preferably, the shear-resisting assembly 5 responds to racking shear loads by permitting the shear transfer plate 16 to separate slightly from the bottom strut 8 at the first end portion 17 when it is in tension, such that the nail prongs 25 tend to withdraw from the bottom face 9 of the bottom strut 8 adjacent the first end portion 17, while the second end portion 18 is squeezed between the bottom strut 8 and the underlying structural component 3 when it is in compression, and as the racking shear loads reverse the shear transfer plate 16 separates slightly from the bottom strut 8 at the second end portion 18, such that the nail prongs 25 tend to withdraw from the bottom face 9 of the bottom strut 8 adjacent the second end portion 18, while the first end portion 17 is squeezed between the bottom strut 8 and the underlying structural component 3, and the nail prongs 25 adjacent the first end portion 17 return to be re-embedded in the bottom strut 8.

As best shown in FIGS. 1A and 1B, the wall 1 of the present invention preferably further includes framing with a mudsill 56 on top of the underlying structural component 3, and a plurality of vertical studs 38 standing on the mudsill 56 and connected thereto. The generally horizontal structural member 4 is a top plate 4 supported by and connected to the plurality of vertical studs 38. The mudsill 56, studs 38 and top plate 4 are sheathed, and the shear-resisting assembly 5 occupies a space between two of the studs 38.

In a preferred embodiment, the first and second chords 13 and 14 can rest directly on the underlying structural component 3 so that the bottom strut 8 is shorter than the shear transfer plate 16. The shear transfer plate 16 is preferably designed to extend beyond the bottom strut 8 and under the first and second chords 13 and 14.

The first and second chords 13 and 14 can rest on the bottom strut 8, which is in turn supported by the underlying structural component 3, but this is not the most preferred embodiment since racking loads might tend to cause the first and second chords 13 and 14 to crush the bottom strut 8.

In another preferred embodiment, the first and second chords 13 and 14 have inner sides 34 that face each other and outer sides 35 that face away from each other, the first anchor bolt 23 is attached to the first chord 13 with a first holdown connector 41 mounted on the outer side 35 of the first chord 13, and the second anchor bolt 24 is attached to the second chord 14 with a second holdown connector 41 mounted on the outer side 35 of the second chord 14.

Basically, the shear-resisting assembly 5 of the present invention is preferably installed as follows. First, the first and second anchor bolts 23 and 24 are embedded in the underlying structural component 3. Then the shear-resisting assembly 5, including the shear transfer plate 16, which has preferably already been applied to the bottom strut 8, is placed over the first and second anchor bolts 23 and 24 so that the first anchor bolt 23 passes through the first anchor opening 20 in the first end portion 17 of the shear transfer plate 16 and the second anchor bolt 24 passes through the second anchor opening 21 in the second end portion 18 of the shear transfer plate 16. The shear transfer plate 16 then rests on the underlying structural component 3. The first and second anchor bolts 23 and 24 are then attached to the shear-resisting assembly 5. The top strut 7 of the shear-resisting assembly 5 is then attached to the generally horizontal structural member 4.

Preferably, the underlying structural component 3 is a concrete foundation 3 and the shear-resisting assembly 5 is placed over the first and second anchor bolts 23 and 24 after the concrete foundation 3 has set.

Alternatively, as shown in FIG. 13, the wall 1 of the present invention is a post-and-beam construction that further includes framing with wall posts 59 that stand on the underlying structural component 3. Between the wall posts 59, a mudsill 56 rests on top of the underlying structural component 3, and a plurality of vertical studs 38 stand on the mudsill 56 and are connected thereto. The generally horizontal structural member 4 is a beam 4 supported by and connected to the wall posts 59. The mudsill 56, studs 38 and top plate 4 are sheathed, and the shear-resisting assembly 5 occupies a space between two of the studs 38.

Alternatively, the sheet metal of the shear transfer plate 16 can be heavy gauge steel, although one of the advantages of the present invention is that the shear transfer plate 16 can be relatively thin, acting essentially only in tension while the bottom strut 8 acts essentially only in compression.

Preferably, the wall 1 of the present invention is built by first creating a concrete form 46 with formboards 47, as shown in FIG. 12, attaching an anchor bolt template 48 to one of the formboards 47, using the anchor bolt template 48 to hold first and second anchor bolts 23 and 24, and pouring concrete into the form 46 to create a concrete foundation 3 with embedded first and second anchor bolts 23 and 24. The anchor bolt template 48 is then preferably removed, but it can be left in place as a moisture barrier, depending on its design. When the concrete has set, the preassembled shear-resisting assembly 5 is lowered over the first and second anchor bolts 23 and 24 so that the first and second anchor bolts 23 and 24 pass through the first and second anchor openings 20 and 21 in the shear transfer plate 16 and are fastened to holdowns 41 that are attached to the first and second chords 13 and 14. The first and second anchor bolts 23 and 24 preferably have threaded ends 50 that protrude above the concrete foundation 3. These threaded ends 50 are fastened with nuts 51. The shear-resisting assembly 5 is surmounted by a generally horizontal structural member 4. The generally horizontal structural member 4 is preferably a double top plate 4 made from two plies of nominal 2×4 lumber. As shown in FIG. 10A, preferably, a plurality of self-drilling screws 52 are driven up through the top strut 7 and into the double top plate 4.

As best shown in FIG. 1A, preferably, the wall 1 of the present invention can also be a conventional stick wall, either built around the shear-resisting assembly 5 of the present invention or into which the shear-resisting assembly 5 of the present invention is inserted. When the shear-resisting assembly 5 of the present invention is part of a stick wall 1, the entire wall 1 or a section can be tilted up onto the foundation 3 and over the threaded ends 50 of the first and second anchor bolts 23 and 24.

The shear-resisting assembly 5 of the present invention can be installed as a shear-resisting element in a conventional first-story wall 1 that rests on a concrete foundation 3 slab or wall. The shear-resisting assembly 5 of the present invention can also be used to create a garage portal, by placing one assembly 5 on each side of the portal. Because of the large open span of a garage portal, engineered shear-resisting elements are particularly important. In this case, the underlying structural component 3 is typically a concrete stem wall 3 and the generally horizontal structural member 4 is typically a wood header 4. As shown in FIG. 10A, the self-drilling screws 52 that connect the shear-resisting assembly 5 to the header 4 are preferably augmented with straps 53 that are fastened to the first and second chords 13 and 14 and the header 4.

The most preferred embodiments of the shear-resisting assembly 5 of the present invention are modular, prefabricated shearwalls made in lengths of 16, 18, 22, 24, 32 and 48 inches measured from the outer side 35 of the first chord 13 to the outer side 35 of the second chord 14 and heights of 7, 8, 9, 10 and 12 feet measured from the bottom face 9 of the bottom strut 8 to the top face 37 of the top strut 7. Preferably, each has a top strut 7, a bottom strut 8 with a shear transfer plate 16 fastened to its bottom face 9 and first, and second chords 13 and 14. The struts 7 and 8 and chords 13 and 14 are made of preferably made of wood glulams, preferably dimensioned so that the shear-resisting assembly 5 can fit within the 2×4 framing of a plywood or OSB-sheathed wall 1 without interfering with interior wall sheathing. Preferably, the shear-resisting assembly 5 has intermediate studs 38 at intervals between the first and second chords 13 and 14. The shear-resisting element 6 is preferably a wood panel made of either Oriented Strand Board (OSB) or plywood. The means for connecting 15 the wood panel 6 is preferably nails. The connection of the nails 15 is preferably reinforced with metal perimeter edging 39 on the edges of the panel 6. The nails 15 are driven into the top and bottom struts 7 and 8 and the first and second chords 13 and 14. The first and second chords 13 and 14 have lower ends 40 and these lower ends are preferably supported on concentric holdowns 41. The concentric holdowns 41 preferably have standoff bases 42 that are in turn supported by u-shaped straps 43 that wrap around the inner and outer sides 34 and 35 of the first and second chords 13 and 14. The standoff bases 42 are preferably u-shaped, matching the u-shaped straps 43, and surmounted by a flat plate 49. The straps 43 in turn preferably rest on support plates 22, which in turn rest on the upper surface 44 of the shear transfer plate 16, centered over the first and second anchor openings 20 and 21 in the first and second end portions 17 and 18 of the shear transfer plate 16. The straps 43 are fastened to the inner and outer sides 34 and 35 of the first and second chords 13 and 14. The nail prongs 25 of the shear transfer plate 16 are preferably pressed into the bottom face 9 of the bottom strut 8 with a hydraulic press.

There are six most preferred embodiments of the shear transfer plate 16 of the present invention, the measurement of each from its first end 26 to its second end 27 matching the measurement of the modular, prefabricating shear-resisting assembly 5 between the outer sides 35 of the first and second chords 13 and 14. The first four preferred embodiments are shown in FIGS. 6A-9C.

In a first preferred embodiment, the shear transfer plate 16 of the present invention is 16 inches from its first end 26 to the second end 27 and 3⅜ inches from its first side 28 to its second side 29. It is formed from 16 gauge G90 ASTM A653 SS galvanized sheet steel. The first and second end portions 17 and 18 are 3¾ inches from the first and second ends 26 and 27, respectively, to the middle portion 9. The middle portion 19 is 8½ inches from the first end portion 17 to the second end portion 18. There are 9 alternating rows 36 of 4 and 5 nail prongs 25 each in the middle portion 19, filling the middle portion 19 from the first end portion 17 to the second end portion 18. The rows 36 run parallel to the first and second ends 26 and 27 of the shear transfer plate 16. The rows 36 are ½ inch apart along the shear transfer plate 16. The nail prongs 25 are $^{11}/_{16}$ inches apart within each row 36. In the rows that have 4 nail prongs 25 each, the nail prongs 25 nearest the first and second sides 28 and 29 of the shear transfer plate 16 are $^{21}/_{32}$ inches from the first and second sides 28 and 29. In the rows that have 5 nail prongs 25 each, the nail prongs 25 nearest the first and second sides 28 and 29 of the shear transfer plate 16 are $^{5}/_{16}$ inches from the first and second sides 28 and 29. The nail prongs 25 are ⅜ inches long. The first and second anchor openings 20 and 21 are obround, each having two rounded ends 30 and 31, an outer side 32 and an inner side 33. The outer sides 32 are 1¼ inches from the first and second ends 26 and 27 of the shear transfer plate 16. The rounded ends 30 and 31 are $^{15}/_{16}$ inches from the first and second sides 28 and 29 of the shear transfer plate 16. The first and second anchor openings 20 and 21 are $^{15}/_{16}$ inches wide and 1½ inches long, their first and second sides 32 and 33 parallel to the first and second ends 26 and 27 and perpendicular to the first and second sides 28 and 29 of the shear transfer plate 16.

In a second preferred embodiment, the shear transfer plate 16 of the present invention has the same dimensions as the first preferred embodiment except that it is 18 inches from its first end 26 to the second end 27, the middle portion 19 is 10½ inches from the first end portion 17 to the second end portion 18, and there are 11 alternating rows 36 of 4 and 5 nail prongs 25 each in the middle portion 19, filling the middle portion 19 from the first end portion 17 to the second end portion 18.

In a third preferred embodiment, the shear transfer plate 16 of the present invention has the same dimensions as the first preferred embodiment except that it is 22 inches from its first end 26 to the second end 27, the middle portion 19 is 14½ inches from the first end portion 17 to the second end portion

18, and there are 15 alternating rows 36 of 4 and 5 nail prongs 25 each in the middle portion 19, filling the middle portion 19 from the first end portion 17 to the second end portion 18.

In a fourth preferred embodiment, the shear transfer plate 16 of the present invention has the same dimensions as the first preferred embodiment except that it is 24 inches from its first end 26 to the second end 27, the middle portion 19 is 16½ inches from the first end portion 17 to the second end portion 18, and there are 17 alternating rows 36 of 4 and 5 nail prongs 25 each in the middle portion 19, filling the middle portion 19 from the first end portion 17 to the second end portion 18.

In a fifth preferred embodiment, the shear transfer plate 16 of the present invention has the same dimensions as the first preferred embodiment except that it is 32 inches from its first end 26 to the second end 27, the middle portion 19 is 24½ inches from the first end portion 17 to the second end portion 18, and there are 25 alternating rows 36 of 4 and 5 nail prongs 25 each in the middle portion 19, filling the middle portion 19 from the first end portion 17 to the second end portion 18.

In a sixth preferred embodiment, the shear transfer plate 16 of the present invention has the same dimensions as the first preferred embodiment except that it is 48 inches from its first end 26 to the second end 27, the middle portion 19 is 40½ inches from the first end portion 17 to the second end portion 18, and there are 41 alternating rows 36 of 4 and 5 nail prongs 25 each in the middle portion 19, filling the middle portion 19 from the first end portion 17 to the second end portion 18.

I claim:

1. A wall designed to resist lateral forces imposed on a building incorporating said wall, said building having an underlying structural component supporting said wall and a generally horizontal structural member, through which lateral shear forces are transmitted, surmounting said wall, said wall comprising:
   a. a shear-resisting assembly connected to said generally horizontal structural member and also connected to said underlying structural component and disposed between said generally horizontal structural member and said underlying structural component, said shear-resisting assembly including:
      i. a shear-resisting element;
      ii. a top strut disposed substantially parallel to said generally horizontal structural member;
      iii. a bottom strut, having a bottom face, a first end and a second end and a distance between said first and second ends, said distance constituting a selected length of said bottom strut, disposed lengthwise substantially parallel to said underlying structural component;
      iv. a first chord connected to said top strut and said shear-resisting element;
      v. a second chord connected to said top strut and said shear-resisting element;
      vi. means for connecting said shear-resisting element to a plurality of said top strut, said bottom strut, said first chord and said second chord, a plurality of said top and bottom struts and said first and second chords forming a supporting frame for said shear-resisting element;
      vii. a shear transfer device, including:
         1. a first substantially planar end portion having a first anchor opening, said first end portion being proximate said first end of said bottom strut;
         2. a first substantially planar inner portion joined to said first end portion and in substantially the same plane, said first inner portion being disposed between said bottom strut and said underlying structural component, said first inner portion interfacing with said bottom face of said bottom strut and being fastened to said bottom face of said bottom strut with mechanical fasteners that do not connect said shear-resisting assembly to said underlying structural member;
         3. a second substantially planar end portion having a first anchor opening, said second end portion being proximate said second end of said bottom strut; and
         4. a second substantially planar inner portion joined to said second end portion and in substantially the same plane, said second inner portion being disposed between said bottom strut and said underlying structural component, said second inner portion interfacing with said bottom face of said bottom strut and being fastened to said bottom face of said bottom strut with mechanical fasteners that do not connect said shear-resisting assembly to said underlying structural member;
   b. a first anchor bolt passing through said first anchor opening in said shear transfer device and connecting said shear-resisting assembly to said underlying structural component of said building; and
   c. a second anchor bolt passing through said second anchor opening in said shear transfer device and connecting said shear-resisting assembly to said underlying structural component of said building, wherein no additional anchor bolt is positioned between said first anchor bolt and said second anchor bolt.

2. The wall of claim 1 wherein:
   a. said shear transfer device is a shear transfer plate wherein said first inner portion and said second inner portion join between said first end portion and said second end portion to form a middle portion.

3. The wall of claim 2 wherein:
   a. said shear transfer plate is a single-piece, unitary member.

4. The wall of claim 3 wherein:
   a. said shear transfer plate interfaces with said bottom face of said bottom strut along the greater portion of the length of said bottom face of said bottom strut.

5. The wall of claim 4 wherein:
   a. said shear transfer plate is fastened to said bottom face of said bottom strut along the greater portion of the length of said bottom face of said bottom strut.

6. The wall of claim 5 wherein:
   a. said mechanical fasteners penetrate said bottom face of said bottom strut but do not pass through said bottom strut.

7. The wall of claim 6 wherein:
   a. said mechanical fasteners are integral nail prongs formed from the material of said shear transfer plate.

8. The wall of claim 7 wherein:
   a. said bottom strut is made of wood.

9. The wall of claim 8 wherein:
   a. said first and second anchor openings are obround, each having a first rounded end, a second rounded end, an outer side and an inner side.

10. The wall of claim 9 wherein said shear transfer plate has a first end, a second end, a first side and a second side.

11. The wall of claim 10 wherein:
    a. said first and second anchor openings are oriented so that said first rounded ends face one of said first and second sides of said shear transfer plate and said second rounded ends face another of said first and second sides of said shear transfer plate.

12. The wall of claim 11 wherein:
a. said first and second anchor openings are dimensioned so that said outer sides are in contact with the first and second anchor bolts received by said first and second anchor openings.

13. The wall of claim 12 wherein:
a. said first and second anchor openings are dimensioned so that said inner sides are not in contact with the first and second anchor bolts received by said first and second anchor openings.

14. The wall of claim 13 wherein:
a. said first and second chords of said wall rest on holdowns that are supported by said underlying structural member.

15. The wall of claim 14 wherein:
a. said shear-resisting element is at least one panel.

16. The wall of claim 15 wherein:
a. said panel is made of wood.

17. The wall of claim 16 wherein:
a. said underlying structural component is cementitious.

18. The wall of claim 17 wherein:
a. said underlying structural component is a concrete foundation.

19. The wall of claim 18 wherein:
a. said shear transfer plate is made of sheet metal.

20. The wall of claim 19 wherein:
a. said shear-resisting assembly is a modular, prefabricated structure.

21. The wall of claim 20 wherein:
a. said shear-resisting assembly responds to racking shear loads by permitting said shear transfer plate to separate slightly from said bottom strut at said first end portion when it is in tension, such that said nail prongs tend to withdraw from said bottom face of said bottom strut adjacent said first end portion, while said second end portion is squeezed between said bottom strut and said underlying structural component when it is in compression, and as said racking shear loads reverse said shear transfer plate separates slightly from said bottom strut at said second end portion, such that said nail prongs tend to withdraw from said bottom face of said bottom strut adjacent said second end portion, while said first end portion is squeezed between said bottom strut and said underlying structural component, and said nail prongs adjacent said first end portion return to be re-embedded in said bottom strut.

22. The wall of claim 20 wherein:
a. said wall further includes framing with a mudsill on top of said underlying structural component, a plurality of vertical studs standing on said mudsill and connected thereto, said generally horizontal structural member is a top plate supported by and connected to said plurality of vertical studs, said mudsill, studs and top plate are sheathed, and said shear-resisting assembly occupies a space between two of said studs.

23. The wall of claim 2 wherein:
a. said first and second chords of said wall bypass said bottom strut such that said bottom strut is shorter than said shear transfer plate.

24. The wall of claim 2 wherein:
a. said first and second chords of said wall rest on said bottom strut, which is supported by said underlying structural component.

25. The wall of claim 2 wherein:
a. said first and second chords have inner sides that face each other and outer sides that face away from each other, said first anchor bolt is attached to said first chord with a first holdown connector mounted on said outer side of said first chord, and said second anchor bolt is attached to said second chord with a second holdown connector mounted on said outer side of said second chord.

26. The wall of claim 2 wherein:
a. said underlying structural component is cementitious.

27. A method of installing the wall of claim 26 wherein:
a. said first and second anchor bolts are embedded in said underlying structural component;
b. said shear-resisting assembly is placed over said first and second anchor bolts, so that said first anchor bolt passes through said first anchor opening in said first end portion of said shear transfer plate and said second anchor bolt passes through said second anchor opening in said second end portion of said shear transfer plate, and said shear transfer plate rests on said underlying structural component;
c. said first and second anchor bolts are attached to said shear-resisting assembly;
d. said top strut of said shear-resisting assembly is attached to said generally horizontal structural member.

28. The method of claim 27 wherein:
a. said underlying structural component is a concrete foundation.

29. The method of claim 28 wherein:
a. said underlying structural component is a concrete foundation and shear-resisting assembly is placed over said first and second anchor bolts after said concrete foundation has set.

30. The wall of claim 2 wherein:
a. said wall further includes framing with wall posts that stand on said underlying structural component, and between said wall posts a mudsill rests on top of said underlying structural component, a plurality of vertical studs surmounted by a top plate stand on said mudsill and are connected thereto, said generally horizontal structural member is a beam supported by and connected to said wall posts, said mudsill, studs and top plate are sheathed, and said shear-resisting assembly occupies a space between two of said studs.

31. The wall of claim 2 wherein:
a. said sheet metal is heavy gauge steel.

* * * * *